United States Patent

Tuzio et al.

[11] Patent Number: 5,917,875
[45] Date of Patent: Jun. 29, 1999

[54] APPARATUS FOR INSPECTING NUCLEAR FUEL ASSEMBLIES

[75] Inventors: Barry Tuzio, Runcorn; Alan Blackwell, Warrington, both of United Kingdom

[73] Assignee: British Nuclear Fuels plc, Cheshire, United Kingdom

[21] Appl. No.: 09/051,219

[22] PCT Filed: Sep. 24, 1996

[86] PCT No.: PCT/GB96/02346

§ 371 Date: Apr. 3, 1998

§ 102(e) Date: Apr. 3, 1998

[87] PCT Pub. No.: WO97/14155

PCT Pub. Date: Apr. 17, 1997

[30] Foreign Application Priority Data

Oct. 6, 1995 [GB] United Kingdom ............... 9520412

[51] Int. Cl.[6] ............................................. G21C 17/06
[52] U.S. Cl. .................. 376/245; 376/248; 376/258; 376/310; 376/261
[58] Field of Search ................................ 376/245, 248, 376/258, 261, 310; 33/502

[56] References Cited

U.S. PATENT DOCUMENTS

| 4,274,205 | 6/1981 | Starr et al. ........................... 376/245 |
|---|---|---|
| 4,728,483 | 3/1988 | Ahmed et al. ........................ 376/258 |
| 4,759,897 | 7/1988 | Tolino et al. ........................ 376/258 |
| 5,377,238 | 12/1994 | Gebelin et al. ...................... 376/260 |

FOREIGN PATENT DOCUMENTS

| 0 183 127 | 6/1986 | European Pat. Off. . |
|---|---|---|
| 64-79697 | 3/1989 | Japan . |

*Primary Examiner*—Daniel D. Wasil
*Attorney, Agent, or Firm*—Nixon & Vanderhye P.C.

[57] ABSTRACT

Apparatus for rectifying the tendency of a fuel assembly (1) to incline from the perpendicular has a top nozzle support (19) and a base assembly (18) for supporting, respectively, a top nozzle (7) and a bottom nozzle (2) of the fuel assembly. Incorporated in the base assembly is an elevating device (78, 79) which is operable to raise the fuel assembly. When raised, a grinding assembly (62) in the base assembly is able to remove material from the lower surfaces of the bottom nozzle so that they lie in a horizontal plane. The elevating device comprises a gimbal mounting arrangement which includes a gimbal (94) movably supported on a gimbal mount (88) by means of cooperating male and female spherically-shaped bearing surfaces. The grinding assembly includes a grinding wheel (66) which is mounted on a rotor (43) arranged for rotation about an axis along which the elevating device raises the fuel assembly so that material can be removed from each of the lower surfaces during one revolution of the rotor.

17 Claims, 13 Drawing Sheets

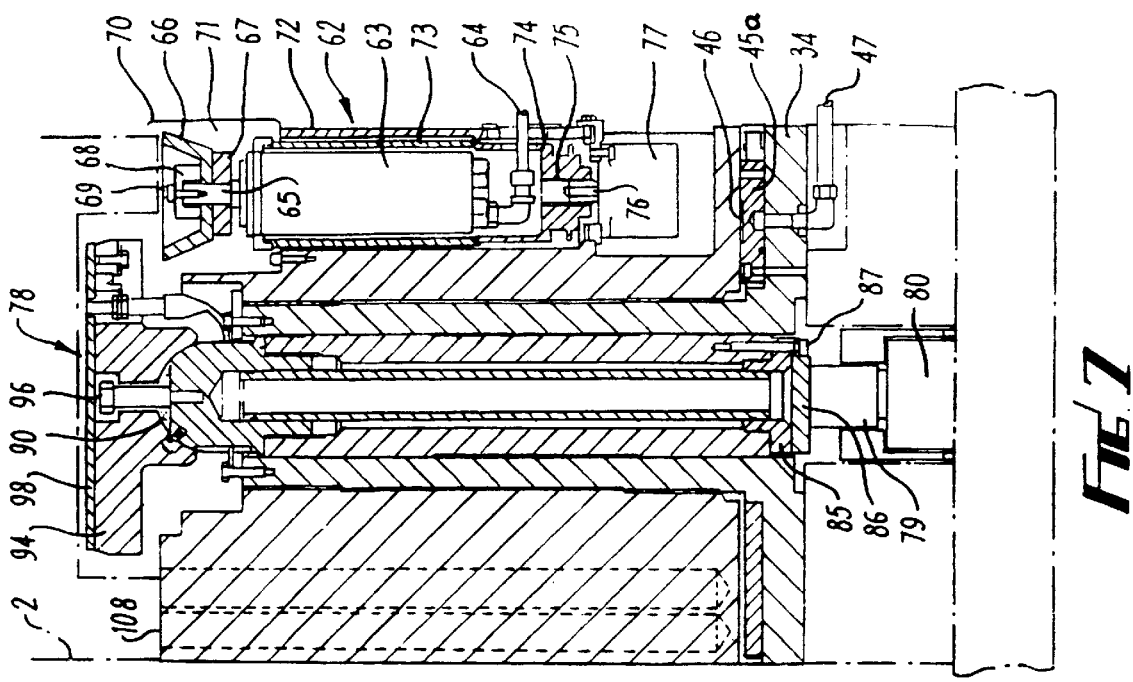

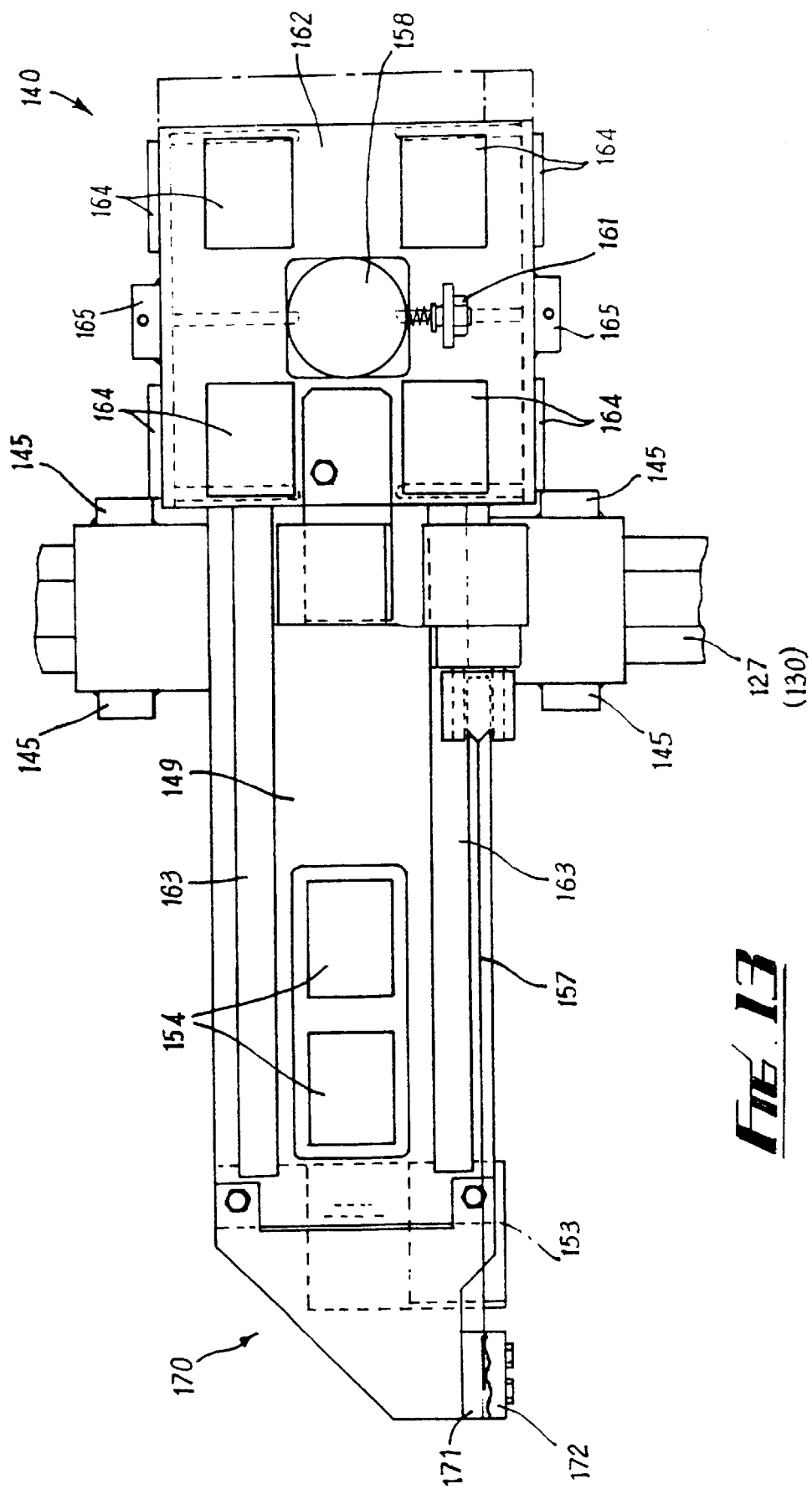

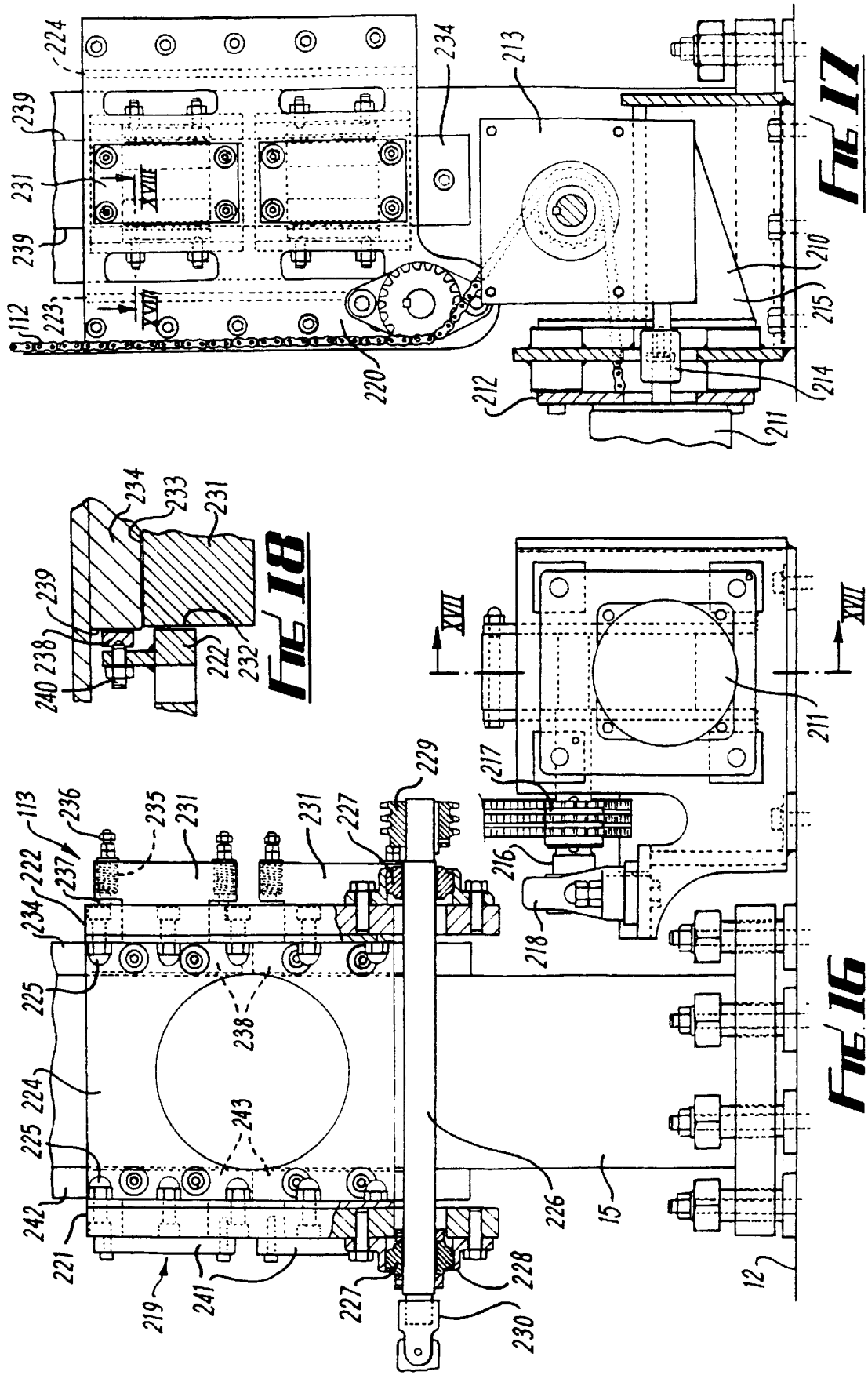

APPARATUS FOR INSPECTING NUCLEAR FUEL ASSEMBLIES

The present invention relates to apparatus for inspecting nuclear fuel assemblies and, in particular with apparatus which will rectify the tendency of a fuel assembly to incline from the perpendicular.

Typically, a nuclear fuel assembly comprises a plurality of fuel rods and control rod guide thimbles held in parallel relationship by spacer grids arranged at spaced locations along the fuel rods and secured to the guide thimbles. Attached to opposite ends of the guide thimbles are top and bottom nozzles. When installed in the core of a nuclear reactor, the fuel assemblies are arranged in close proximity to one another between upper and lower core plates. Since the fuel assemblies in the reactor core are closely spaced, it is essential that each fuel assembly upon completion satisfies stringent quality control procedures, particularly with regard to dimensional accuracy.

It is particularly important to ensure that the fuel assembly stands truly perpendicular when the bottom nozzle of an assembly is supported by a horizontal surface. A known technique for ensuring perpendicularity of a fuel assembly involves measuring the out of alignment of the assembly from the perpendicular using a theodilite or similar instrument and assessing how much material requires to be removed from the lower surfaces of the bottom nozzle. The fuel assembly is then placed in a vertical position and the required amount of material is removed by grinding one or more of the bottom nozzle surfaces. After the grinding operation, the fuel assembly is placed on a horizontal surface and remeasured. If necessary, further material is ground from the bottom nozzle until the desired verticality of the fuel assembly is attained. This technique for rectifying the tilt of a fuel assembly is not satisfactory in that it involves several time-consuming mechanical handling operations to move the assembly between the measuring and grinding positions.

According to the invention there is provided apparatus for rectifying the tendency of a nuclear fuel assembly to incline from the perpendicular, the fuel assembly having interconnected upper and lower support members, the apparatus comprising an upper locating means for locating the upper support member and a base assembly adapted to support said lower support member whereby the fuel assembly extends perpendicularly between the upper locating means and said base assembly, elevating means incorporated in said base assembly, the elevating means being operable to engage the lower support member and raise the fuel assembly, the base assembly further including material removal means operable to remove material from a lower surface of the lower support member when raised by the elevating means whereby said lower surface is made to lie in a horizontal plane.

Preferably the base assembly includes a support surface on which the lower surface of the lower support member rests, the elevating means being operable to raise the lower surface above the support surface.

Advantageously the elevating means moves along an axis coaxial with a longitudinal central axis of the fuel assembly.

The lower support surface may comprise a plurality of lower surfaces, the material removal means being operable to remove material from each of the lower surfaces, whereby each of the lower surfaces is made to lie in said horizontal plane.

The elevating means preferably comprises a gimbal mounting arrangement which includes a gimbal member movably supported on a gimbal mount and arranged to engage the lower support member.

Preferably the gimbal member has a spherically-shaped female bearing portion which receives a spherically-shaped male bearing portion provided on the gimbal mount.

In a preferred embodiment the material removal means comprises a grinding wheel, the grinding wheel being mounted on a rotor member arranged for rotation about the axis along which the elevating means moves.

Advantageously the grinding wheel is radially spaced from the axis about which the rotor member rotates, whereby the grinding wheel is able to remove material from each of the lower surfaces during one revolution of the rotor member.

Preferably the base assembly includes a vertical post, the rotor member being arranged to rotate about the post, and wherein pressurised air bearings are provided between the post and the rotor member.

The base assembly may include a stationary gear wheel arranged coaxially with respect to the axis along with the elevating means moves, the gear wheel having gear teeth provided around the periphery thereof, and a drive motor mounted on said rotor member, the drive motor having an output gear wheel arranged to mesh with the stationary gear wheel.

Drive means are preferably provided for moving the grinding wheel along its axis of rotation.

The drive means for moving the grinding wheel along its axis of rotation may comprise a stepper motor which moves the grinding wheel along said axis of rotation in incremental steps.

Preferably the base assembly includes at least one locating pin and actuator means for extending and retracting the locating pin along a vertical axis, whereby the locating pin can be inserted into or retracted from a locating hole provided in said lower support member.

The upper locating means preferably includes at least one upper locating pin and further actuating means for extending and retracting said upper locating pin along a vertical axis, whereby the upper locating pin can be inserted into or retracted from an upper locating hole provided in the upper support member.

The upper locating pin may comprise a larger diameter portion of substantially the same diameter as that of the upper locating hole and a reduced diameter end portion, the further actuator means being operable to insert the larger diameter portion or the reduced diameter end portion into the upper locating hole.

Advantageously the base assembly includes measuring means for determining the weight of the fuel assembly.

The measuring means preferably comprises a load cell located beneath the elevating means.

Embodiments of the invention will now be described by way of example with reference to the accompanying drawings, in which;

FIGS. 6 and 7 are sectional elevations of a base assembly for the inspection station shown in FIG. 2, taken on the lines VI—VI and VII—VII in FIG. 3, respectively.

FIGS. 12 and 13 are a part sectional front elevation and a plan view, respectively, of a camera and channel spacing probe assembly for the inspection station shown in FIG. 2;

FIG. 16 is an end elevation of a chain drive and tensioner unit for the inspection station shown in FIG. 2;

FIG. 17 is a sectional front elevation of the chain drive and tensioner unit shown in FIG. 16 taken on the line XVII—XVII in FIG. 16;

FIG. 18 is a fragmentary sectional plan view taken on the line XVIII—XVIII in FIG. 17;

Figure 1:
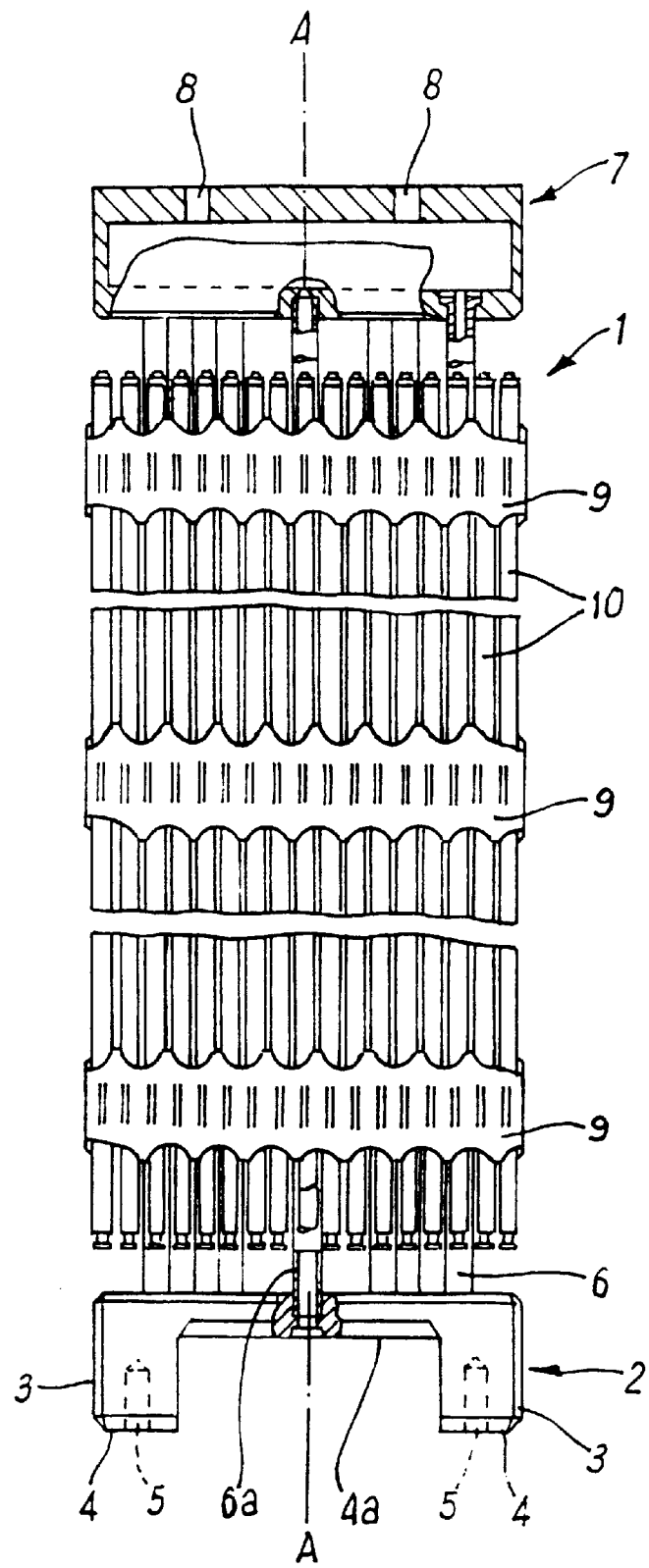
FIG. 1 shows a typical nuclear fuel assembly of the type suitable for inspection at an inspection station in accordance with the present invention.

FIG. 1 shows a nuclear fuel assembly 1 of the general type used in a pressurised water reactor. The fuel assembly 1 comprises a lower support member in the form of a bottom nozzle 2. At each corner the bottom nozzle 2 is provided with a foot 3 having a lower surface 4 which, in use, rests on the lower core plate of a nuclear reactor, and a recessed surface 4a. Provided in each of two diagonally opposite feet 3 is a locating hole 5 for the purpose hereinafter described. Extending upwardly from the bottom nozzle 2 are a number of control rod guide thimbles 6, the upper ends of which are connected to an upper support in the form of a top nozzle 7. Two locating holes 8 are provided in the upper surface of the top nozzle 7. At regularly spaced locations along the fuel assembly transverse spacer grids 9 are attached to and supported by the guide thimbles 6. Each spacer grid 9 comprises a cellular structure, formed by intersecting metal strips, in which a parallel array of fuel rods 10 are supported. An instrumentation tube 6a extends along a longitudinal central axis A of the assembly between the bottom and top nozzles 2, 7.

Before installation in the core region of a nuclear reactor, it is necessary for a newly constructed fuel assembly 1 to satisfy certain stringent inspection procedures. These procedures include carrying out a full dimensional check, including measuring the channel spacing between adjacent fuel rods 10, a visual surface examination of the fuel rods, and obtaining the weight of the fuel assembly 1. It is particularly important that any tendency for the fuel assembly 1 to lean or tilt with respect to the vertical axis of the assembly, that is, to incline from the perpendicular, is detected and rectified before it is installed in the reactor core.

Figure 2:
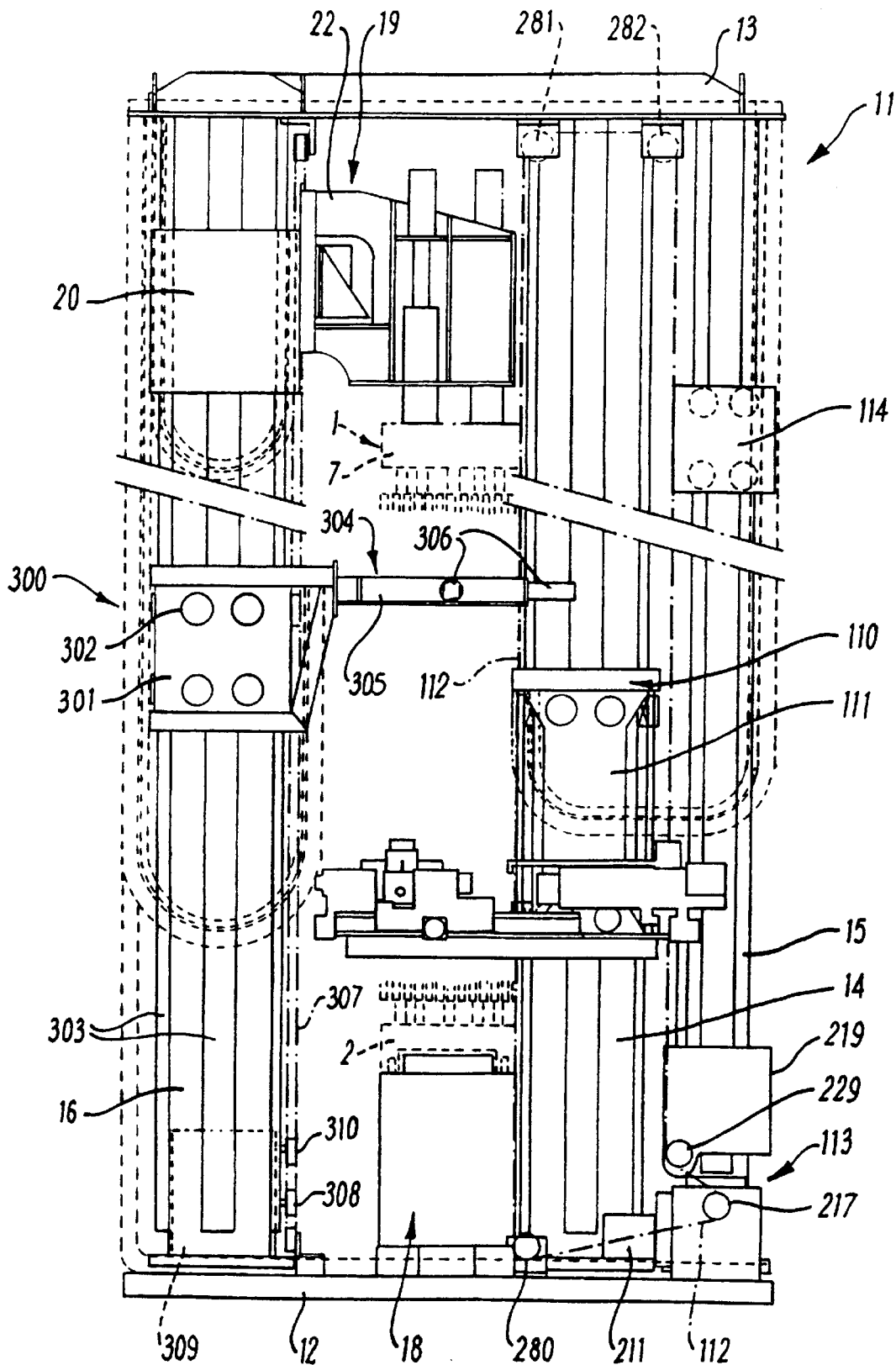
FIG. 2 shows a front elevation of an inspection station for nuclear fuel assemblies according to a preferred embodiment of the invention.
Figure 3:
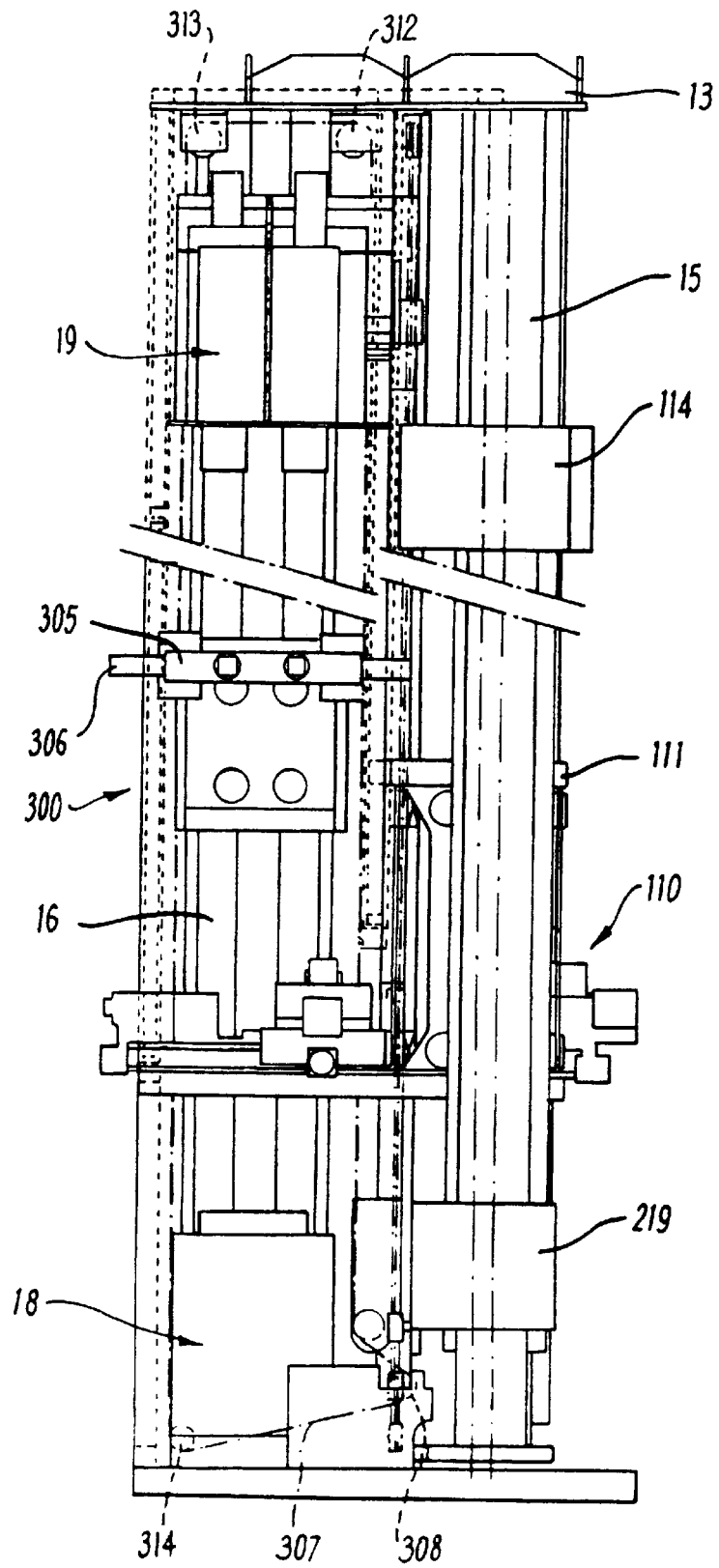
FIG. 3 is an end elevation of the inspection station shown in FIG. 2.
Figure 4:
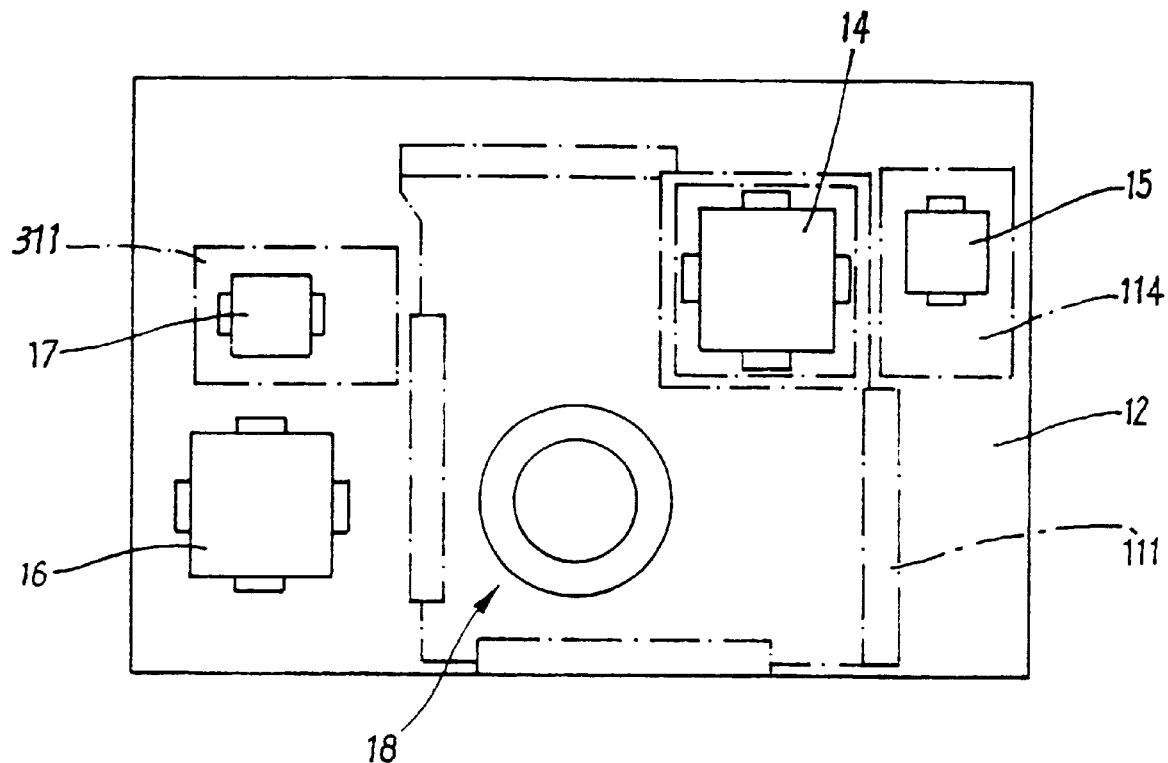
FIG. 4 is a diagrammatic plan view showing the disposition of the columns for the inspection station shown in FIG. 2.

These procedures are carried out automatically in accordance with the present invention by an automatic inspection station, generally designated by the numeral 11, as seen in FIGS. 2, 3 and 4. The inspection station 11 comprises a baseplate 12 and a top plate 13 which are interconnected by four vertical rectangular-section, columns 14, 15, 16, 17. A fuel assembly 1 to be inspected is positioned in the station 11 so that the bottom nozzle 2 is supported on a base assembly 18 and the top nozzle 7 is located by a top nozzle support 19. The top nozzle support 19 comprises a housing 20 of a generally hollow rectangular form which encompasses the column 16. Incorporated in the housing 20 is a stepper motor (not shown) by means of which the top nozzle support 19 can be raised and lowered. Projecting from the housing 20 is a top nozzle support bracket 22 which is movable by drive means (not shown) in a horizontal direction.

Figure 5:
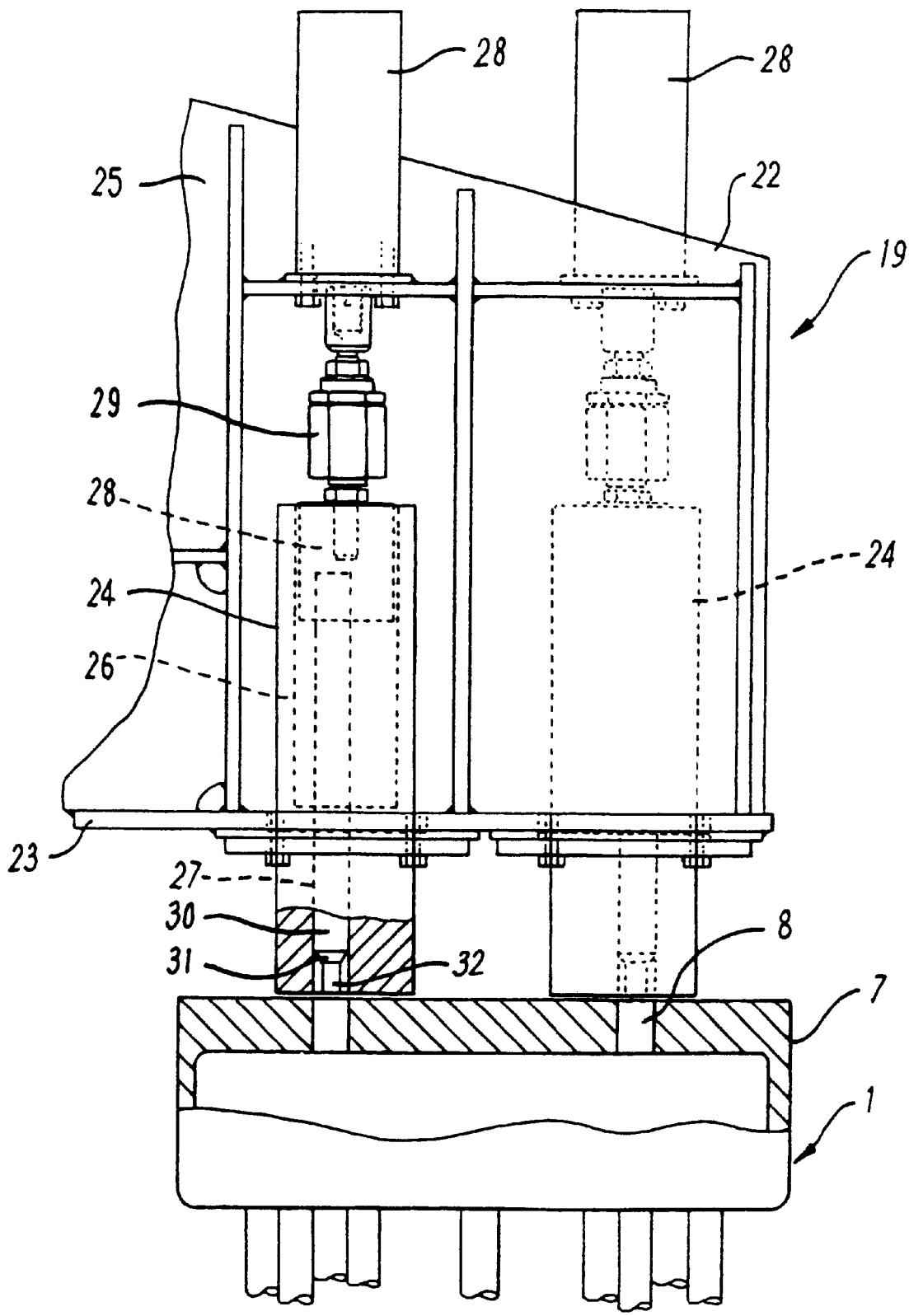
FIG. 5 is a part sectional front elevation of a support arrangement for locating a top nozzle of the fuel assembly.

Referring to FIG. 5, a fuel assembly 1 is shown in position beneath the support bracket 22 of the top nozzle support 19. The support bracket 22 is a fabricated structure comprising a lower plate 23 in which are mounted two guide housings 24 arranged on either side of a central rib 25. Each guide housing 24 has a recessed bore 26, extending downwardly from an upper surface of the housing, and a guide passage 27, extending from a base of the recessed bore 26 to the lower surface of the housing 24. Slidably arranged within the recessed bore 26 is a plunger 28 which is connected to a pneumatic cylinder 28 by means of an adaptor assembly 29. A fuel assembly locating pin 30, secured in the plunger 28, extends through the guide passage 27. At an end remote from the plunger 28 each locating pin 30 has a tapered region 31 leading to a reduced diameter end portion 32. As hereinafter described, the cylinders 28 can be actuated so as to either partially extend or fully extend the locating pins 30 along vertical axes from the retracted position shown in FIG. 5. When the locating pins 30 are partially extended the reduced diameter portion 32 projects in the locating holes 7 and when fully extended the larger diameter portion of the pins extend into the locating holes. The larger diameter of the locating pins 30 is substantially the same as the diameter of the locating holes 7.

The bottom nozzle 2 is supported by the base assembly 18, which is illustrated in more detail in FIGS. 6, 7, 8 and 9. Incorporated in the base assembly 18 is a grinding facility for removing material from the lower surfaces 4 of the bottom nozzle 2. The base assembly 18 comprises a fixed mounting member 33 which has a horizontal base in the form of a circular flange 34 and a vertical hollow cylindrical post 35. The flange 34 is fixedly attached to an annular base 36 which is supported on the baseplate 12. A recess is machined in the upper surface of the flange 34 to accommodate a gear wheel 37 which is secured to the flange 34 by screws 38. Meshing with the gear wheel 37 are gear teeth 39 formed on the end of an output shaft 40 of a stepper motor 41. The stepper motor 41 is mounted on a bracket 42 secured to a rotor 43 arranged for rotation about the post 35. Thus, on operation of the stepper motor 41, the output shaft 40 rotates to effect rotation of the rotor 43 about the post 35. Rotational location of the rotor 43 on the post 35 is provided by an upper bearing sleeve 44 and a lower bearing sleeve 45 interposed between the rotor and the post. Axial thrust of the rotor 43 is borne by three equi-spaced air bearings each comprising a thrust plate 45a having an air pressure chamber 46 formed in an upper surface thereof adjacent to the lower surface of the rotor 43. Pressurised air is supplied to the chamber 46 by means of a pipe 47 and by passages formed in the flange 34 and the thrust plate 45a.

Figure 8:
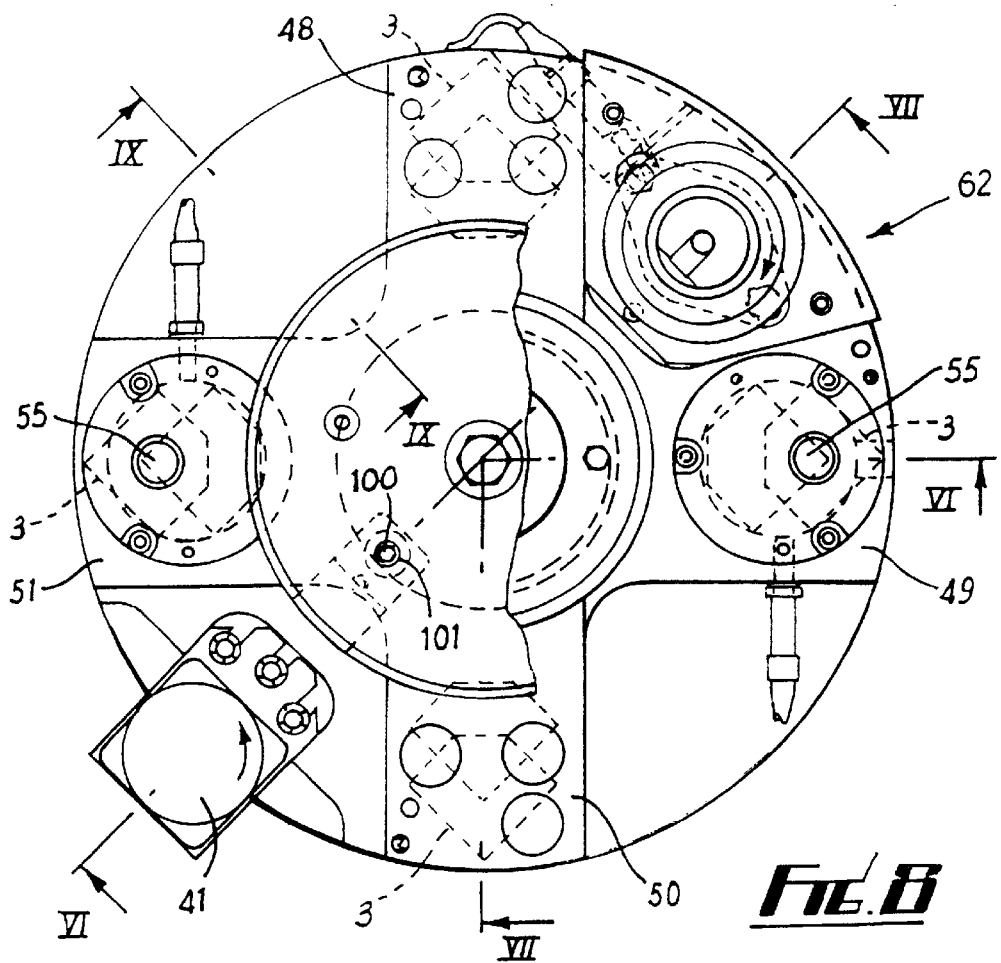
FIG. 8 is a plan view of the base assembly shown in FIGS. 6 and 7.

The rotor 43 is of a generally cruciform cross-section when viewed in plan and comprises four radial protrusions 48, 49, 50, 51 as seen in FIG. 8. Formed in each of the diametrically opposite protrusions 49, 51 are an upper cylindrical recess 52 and a lower cylinder recess 53 of slightly smaller diameter than the upper recess 52. Fixedly mounted in the upper end of the upper recess 52 is a guide housing 54. A vertical passage extends through the guide housing 54 and accommodates a vertically slidable locating pin 55. The lower end of the locating pin 55 seats in a plunger 56 slidably arranged within the recess 52 and to which the pin is secured by a screw 57. Movement of the plunger 56, and hence the locating pin 55, is derived from a double-acting pneumatic actuator 58. The actuator 58 is secured to a transverse mounting plate 59 so as to extend vertically through the lower recess 53. A piston rod 60 extending from the actuator 58 is attached to the plunger 55 by means of an adaptor 61. By operation of the two actuators 58 the locating pins 55 can be Inserted into or retracted from the locating holes 4 provided in the feet 3 of the bottom nozzle 2. Appropriate sensors (not shown) are provided to indicate at a remote control location whether the locating pins 55 are in a retracted or withdrawn positions.

Located between the radial protrusions 48, 49 is a grinding assembly 62 radially spaced from the rotational axis of the rotor 43 and which is used for removing material from the bottom surfaces 4 of the feet 3. The grinding assembly comprises a pneumatic motor 63 to which pressurised operating air is supplied through a pipe 64. Secured to an output shaft 65, projecting upwardly from the motor 63, is a grinding wheel 66. The grinding wheel 66 is clamped between a collar 67 and a clamp member 68 which is urged against the grinding wheel by a screw 69 threaded into the end of the output shaft 65. A sheet metal shroud 70 forms a waste collection chamber 71 which communicates with a suction means (not shown) for withdrawing swarf ground from the bottom nozzle feet 3. The motor 63 is fixedly mounted in a sleeve 72 which is arranged for axial movement within a recess 73 formed in the rotor 43. An extension piece 74, welded to the bottom end of the sleeve 72, has a central hole 75 formed with an internal acme screw thread. The hole 75 receives an output shaft 76 having an external acme screw thread corresponding to that formed in the extension piece 74. Thus, on operation of the stepper motor 77, rotation of the output shaft 75 causes an incremental axial movement of the extension piece 74 and the sleeve 72, thereby resulting in a corresponding incremental upward movement of the motor 63 and the grinding wheel 66. As will be described later, rotation and incremental upward movement of the grinding wheel 66 occurs during operation of the stepper motor 41 so that the grinding operation removes material from the feet 3 as the rotor 43 rotates about the post 35.

Extending centrally through the base assembly 143 is a gimbal mounting arrangement 78 which is supported on a hydraulic/pneumatic intensifier 79 and a load cell 80. The gimbal mounting arrangement 78 comprises a hollow sleeve 81 arranged for longitudinal movement within the post 35. A reduced diameter portion substantially mid-way along the sleeve 81 defines an air bearing chamber 82. Pressurised air is supplied to the chamber 82 through a supply pipe 83 and a passage 84 to provide an air cushion between the sleeve and the post. Sealed to the lower end of the sleeve 81 is an annular connecting member 85 which is secured to the sleeve by means of a plate 86 and screws 87. The upper end of the sleeve 81 supports a gimbal mount 88 having a screw-threaded spigot 89 which is received in a correspondingly screw-threaded recess formed in the end of the sleeve. The gimbal mount 88 has a transverse upper end surface 90 which joins with the cylindrical side surface of the mount as a spherical male bearing portion 91. A tube 92 extends centrally through the sleeve 81 and has a lower end sealed to the connecting member 85 and an upper end sealed within a recess extending into the gimbal mount 88 from a lower end thereof.

Seated on the gimbal mount 88 is a gimbal 94. A spherical female bearing cup 95 is formed in the lower surface of the gimbal 94 so as to correspond in shape to the spherical male bearing 91 provided in the gimbal mount 88. Preferably, the radius of the spherical bearing cup 95 is slightly larger than the radius of the spherical male bearing 91. Swivelling movement of the gimbal 94 on the gimbal mount 88 is limited by a screw 96 which extends through a clearance hole 97 centrally located in the gimbal and is threaded into the gimbal mount 88. A suitable lubricant for the spherical bearing is provided in the space formed between the end surface 90 of the gimbal mount 88 and the bearing cup 95 of the gimbal 94. A cover plate 98 extends over the top of the gimbal 94. Beneath the cover plate 98 two diametrically opposite cut-outs 99 are formed in the gimbal 94. Each cut-out 99 accommodates a probe 100 which senses the presence, through a hole 101 in the cover plate 98, of a bottom nozzle 2 when a fuel assembly is placed on the base assembly 18.

Figure 9:
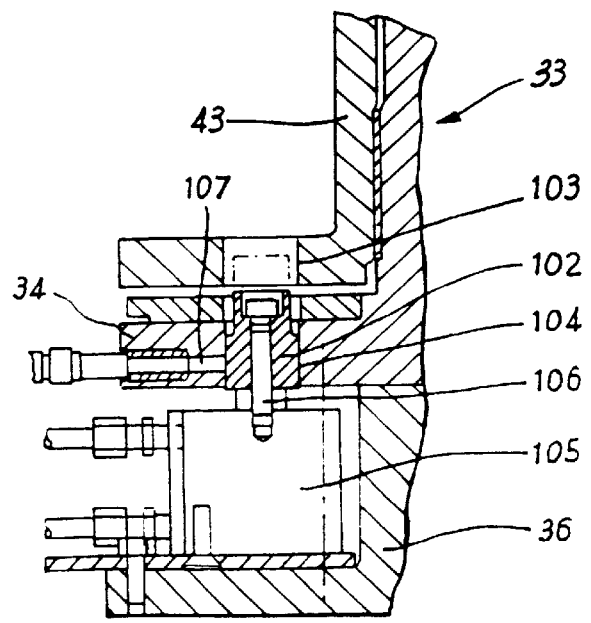
FIG. 9 is a fragmentary section of a shotbolt mechanism for the base assembly taken on the line IX—IX in FIG. 8.

Referring to FIG. 9, rotation of the rotor 43 can be prevented by the insertion of a shotbolt 102 into an aperture 103 formed in the rotor. The shotbolt 102 is slidably arranged in a guide hole 104 provided in the flange 34 of the mounting member 33. Movement of the shotbolt 102 is derived from an actuator 105 mounted on the annular base 36. A setscrew 106 attaches the shotbolt 102 to the actuator 105. A probe 107, extending into the flange 34, is used to sense the position of the shotbolt 102.

When a fuel assembly 1 is installed in the inspection station, the lower surfaces 4 of two of the bottom nozzle feet 3 can rest on the upper surfaces 108 of the two radical protrusions 48, 50, and the lower surfaces 4 of the other two feet 3 rest on the upper surfaces 109 of the two guide housings 54. Each of the support surfaces 108, 109 lie in a common horizontal plane.

A check on the dimensional accuracy of the fuel assembly 1 and a visual inspection of the surfaces of the assembly are carried out by operation of a measuring head assembly 110. The measuring head assembly 110 comprises a carriage 111 which is driven up and down the column 14 by a triplex chain 112 operated by a chain drive and tensioner unit 113. Mounted on the carriage 111 are four cameras for effecting the height and envelope measurements and for the surface inspection, and two channel spacing probes for measuring the spacing between each fuel rod 10. To balance the weight of the measuring head assembly 110 a counterbalance 114 is connected to the drive chain 112 and arranged to move along the column 15.

Figure 11:
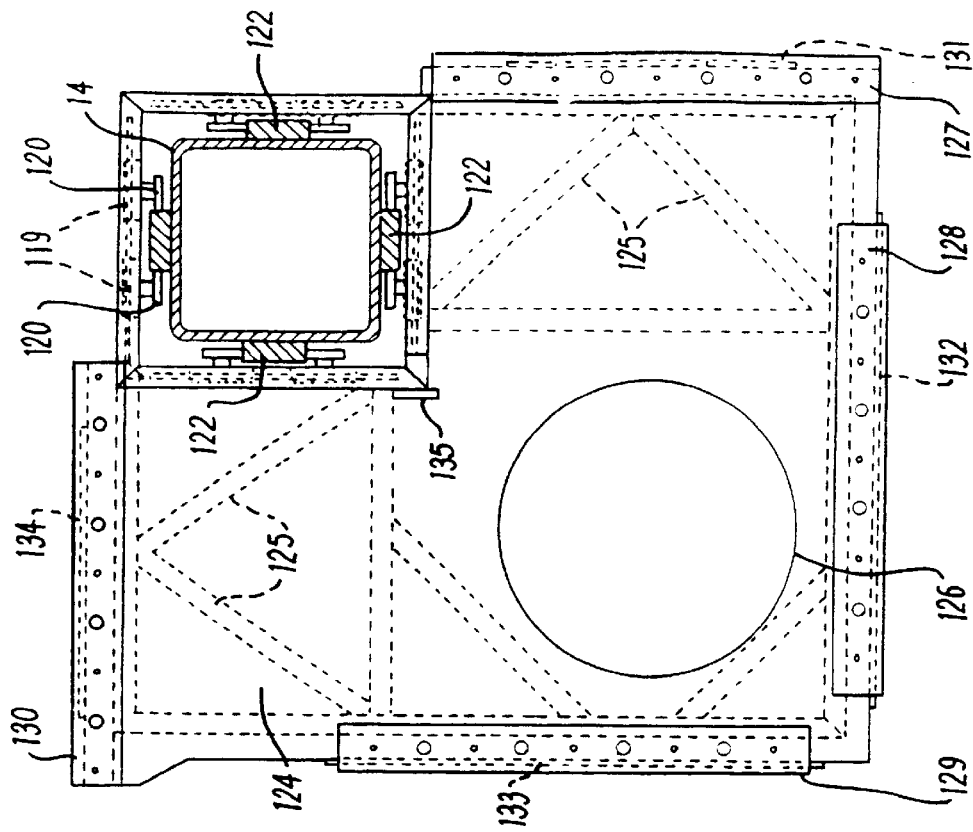
FIG. 11 is a sectional plan view of the measuring head carriage taken on the line XI—XI in FIG. 10.
Figure 10:
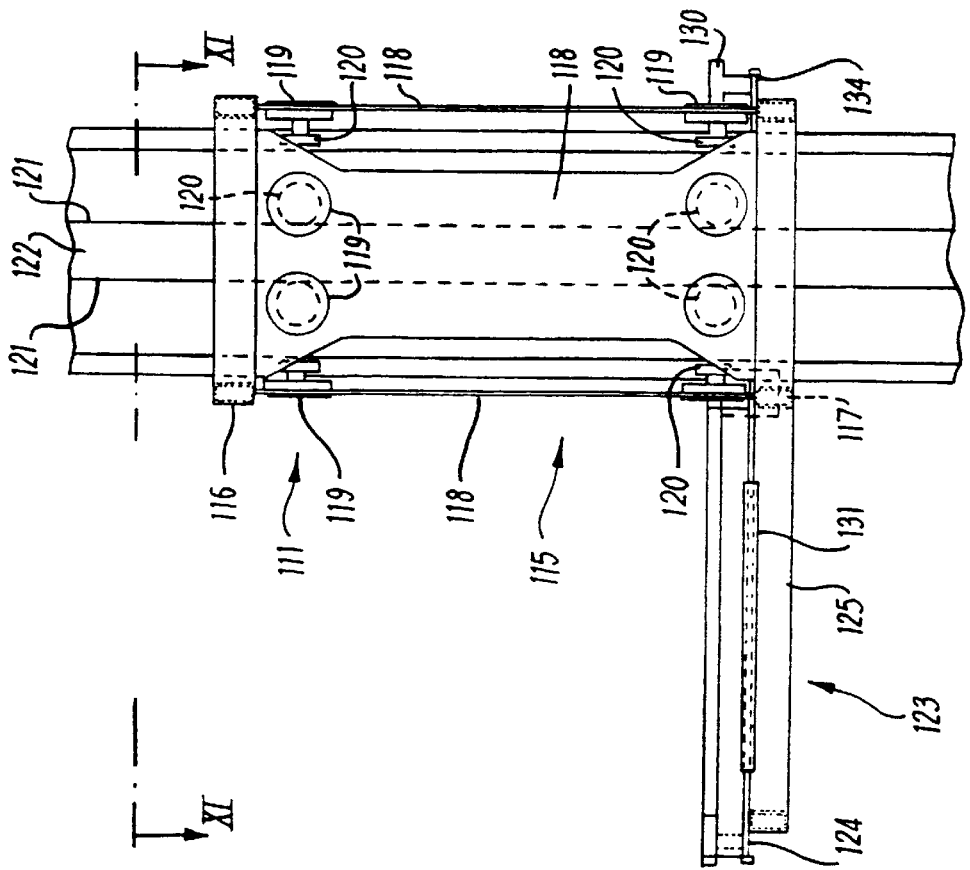
FIG. 10 is a front elevation of a measuring head carriage for the inspection station shown in FIG. 2.

The measuring head carriage 111 is shown in FIGS. 10 and 11 in which the measuring equipment has been removed for clarity. The carriage 111 is a fabricated structure comprising a bearing section 115 formed from upper and lower rims 116, 117 respectively. Each of the rims 116, 117 has four straight sides formed into a square cross-section which encompasses the column 14. Four bearing support plates 118 extend between the upper and lower rims 116, 117 each support plate being parallel to an adjacent side of the column 14. Two bearing assemblies 119 are provided in the upper region of each bearing support plate 118 and two further bearing assemblies 119 are provided in the lower region of each bearing support plate. Each bearing assembly 119 includes a roller 120 rotatable about an axis perpendicular to the side of the column 14 and arranged to run along the side surface 121 of a guide rail 122 secured to and extending along the length of the column 14. As seen in FIG. 11, a guide rail 122 extends along each of the sides of the column 14. The bearing assemblies 119 are arranged in pairs so that the rollers 120 of each pair run along opposite side surfaces 121 of the guide rails 122.

Extending from the lower end of the bearing section 115 at right angles to the column 14 is a tray section 123 on which the measuring equipment is mounted. The tray section 123 comprises a flat plate 124 supported on an array of hollow-section ribs 125. A circular aperture 126, having a diameter such that it will allow a fuel assembly 1 to pass through, is provided in the plate 124. Secured to the upper surface of the plate 124 around the periphery thereof are four tee-sectioned slides 127, 128, 129, 130 along which the measuring instrumentation can be moved. Associated with each of the slides is a toothed rack 131, 132, 133, 134 secured to the sides of the plate 124. Gear teeth are provided on the lower surface of each rack for engagement by means for moving the measuring instrumentation along the slides, as hereinafter described. The chain 112 for raising and lowering the carriage is attached to the upper and lower ends of a chain mounting plate 135 provided at the base of the bearing section 115. A reader head (not shown) is provided on the carriage 111 for scanning a scale fixed to one of the guide rails 122, thereby enabling the vertical position of the carriage to be determined during measurement operations, as hereinafter described.

Figure 12:
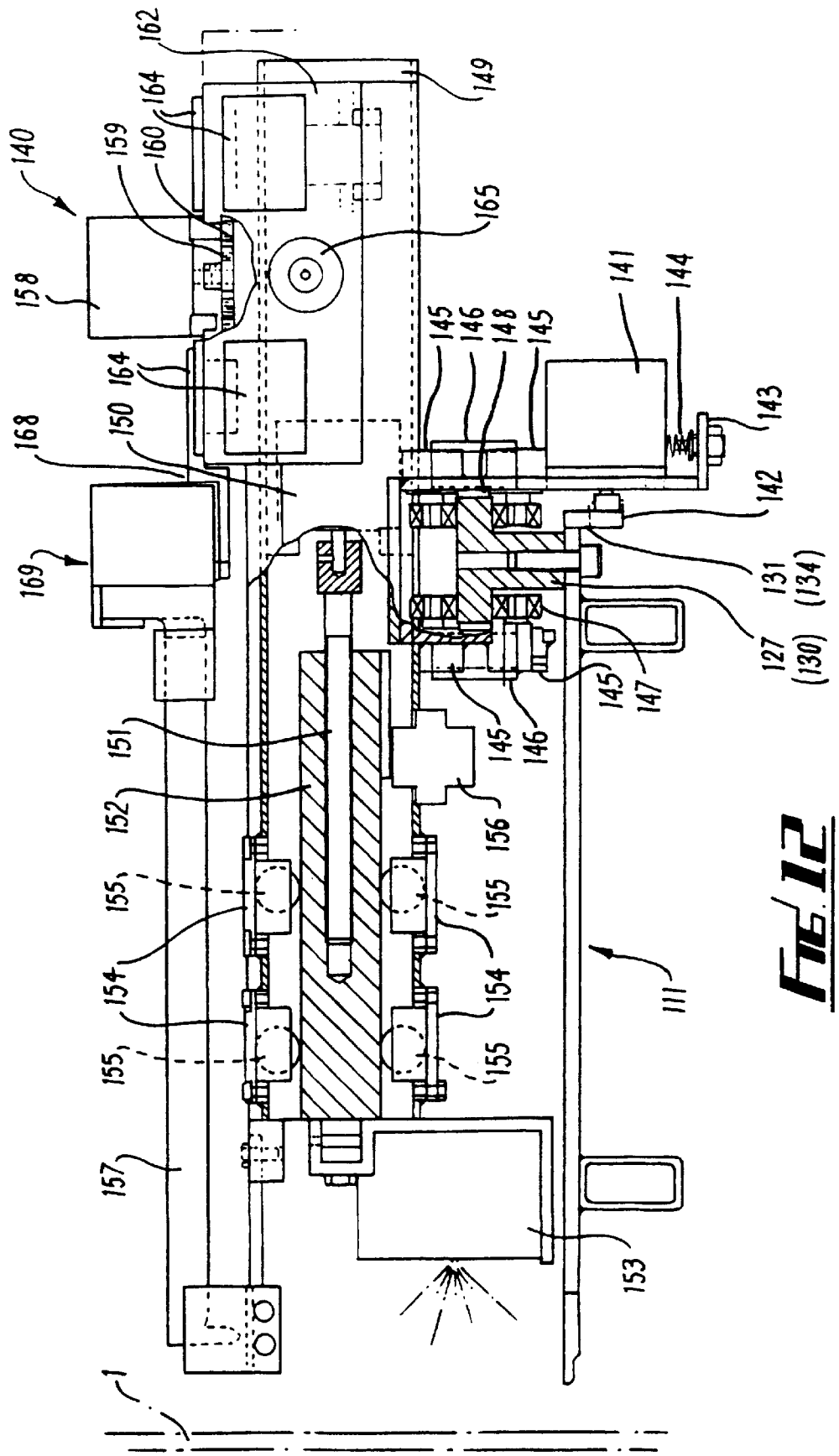

Arranged for movement along each of the tee-shaped slides 127, 130 is a camera and probe assembly 140, as illustrated in FIGS. 12 and 13. Movement of the camera and probe assembly 140 along the respective slide 127, 130 is derived from a stepper motor 141. A gear pinion 142 mounted on the output shaft of the motor 141 meshes with a respective toothed rack 131, 134 secured to the carriage 111. The motor 141 is secured to a lower bearing housing 143 and is biased by a spring assembly 144 so as to urge the pinion 142 into meshing engagement with the associated toothed rack 131, 134. The bearing housing 143 straddles the horizontal portion of the slide 127, 130 and supports four bearing assemblies 145 and two roller assemblies 146 at each side thereof. Each of the eight bearing assemblies 145 includes a roller 147 arranged to run along either an upper or lower surface of the horizontal portion of the slide 127. Each of the two roller assemblies 146 on both sides of the housing 143 includes a roller 148 arranged to run along opposite vertical surfaces of the horizontal portion of the slide 127. A reader head (not shown) is provided for reading a scale provided adjacent to the toothed rack 131 to indicate the distance travelled by the camera and probe assembly along the slide 127. Signals corresponding to the distance travelled are transmitted to a remote control system.

Extending transversely to the bearing housing 143 and fixedly secured thereto is a tube 149 of square cross-section. Secured within the tube 149 is a stepper motor 150 having an output shaft coupled to a lead screw 151. The lead screw 151 is received in a correspondingly threaded hole extending centrally along a rectangular-sectioned operating bar 152. Mounted on the end of the operating bar 152 remote from the motor 150 is a camera 153. Accurate linear movement of the operating bar 152 is provided by a number of bearing cassettes 154, two of which are secured in each side of the mounting tube 149. Each of the bearing cassettes 154 has a roller 155 which contacts a surface of the operating bar 152. On operation of the motor 150 the lead screw 151 is rotated, thereby causing linear movement of the operating bar and the camera 153. The amount of linear movement of the camera 153 is measured by a reader head 156 which scans a scale fixed to the operating bar 152. Electrical signals corresponding to the distance travelled are transmitted to the remote control system.

Included in the two camera and probe assemblies 140 is a probe 157 which functions to check the channel spacings between adjacent fuel rods. Preferably the probe 157 incorporates a strain gauge bridge which converts mechanical deflection of the probe into corresponding electrical signals which are transmitted to the remote control system. Advancement of the probe 157 into the fuel assembly 1 and retraction therefrom is derived from a stepper motor 158, the output shaft of which carries a pinion 159. The pinion 159 is urged into meshing engagement with a fixed gear-toothed rack 160 by a spring device 161 acting on the motor 158. The motor 158 is mounted on an upper bearing housing 162 which is arranged for movement along a pair of guide bars 163 located on either side of the tube 149. Four bearing cassettes 164 are arranged in the top surface of the upper bearing housing 162, each cassette having a roller in contact with an upper horizontal surface of a respective guide bar 163. Two further bearing cassettes 164 are provided in each of the side surfaces of the upper bearing housing 162, each cassette having a roller in contact with the outer vertical surfaces of an associated guide bar 163. A bearing assembly 165 is also provided in each of the side surfaces of the upper bearing housing 162, each assembly having a roller in contact with a lower horizontal surface of a respective guide bar 163.

The probe 157 is connected to the upper bearing housing 162 by means of a bracket 168 and an electromagnetic coupling assembly 169. Supported at the end of the tube 149 is a 3-point temperature-compensated calibration device 170 through which the probe passes prior to insertion in the fuel assembly 1. The calibration device 170 includes two plates 171, 172, the latter having three projections so as to define with the plate 171 three gaps of varying dimensions. The gaps increase progressively along the path of the probe 157 towards the fuel assembly 1 and are selected to provide three calibration measurements across the specific measuring range for a particular type of fuel assembly. If the probe 157 becomes stuck in the fuel rods of the fuel assembly it will be released automatically by the electromagnetic coupling assembly 169 thereby preventing possible damage to the fuel rods 10.

Figure 15:
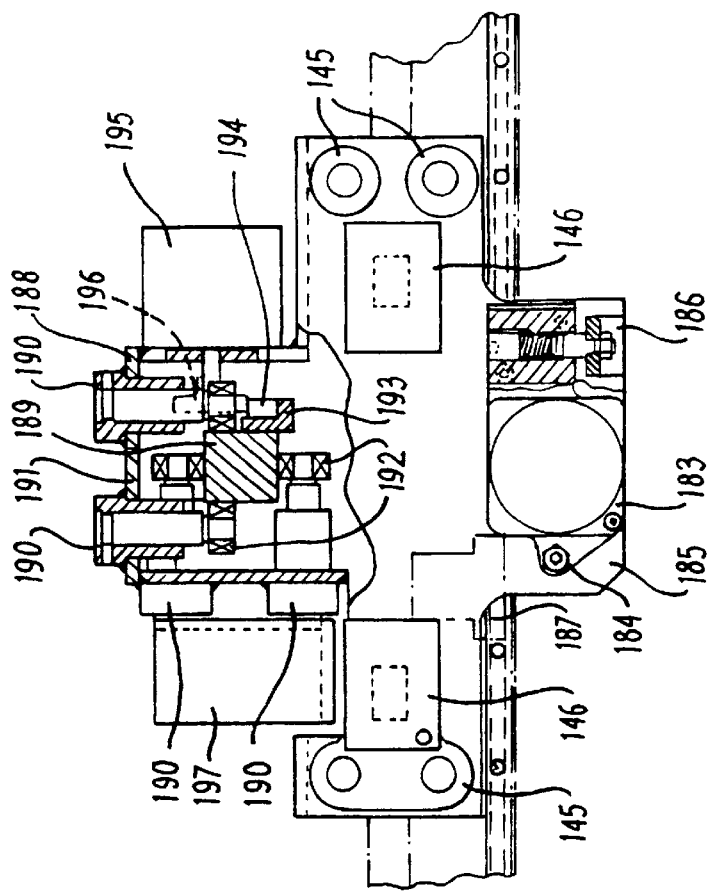
FIGS. 14 and 15 are part sectional elevations of a camera assembly for the inspection station shown in FIG. 2.
Figure 14:
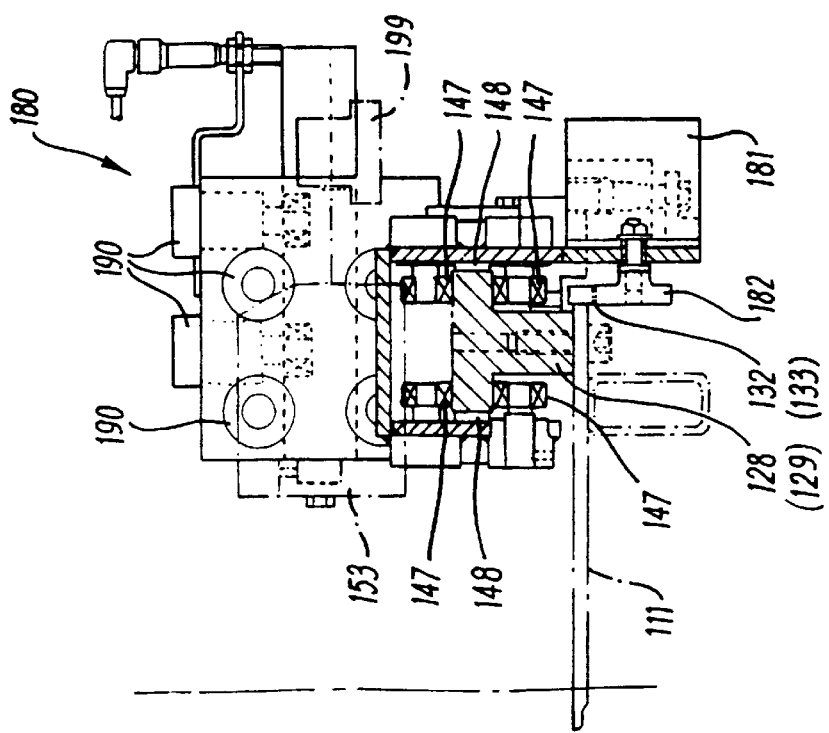

Arranged for movement along each of the tee-shaped slides 128, 129 on the measuring head carriage 111 is a camera assembly 180, as seen in FIGS. 14 and 15. Movement of the camera assembly 180 along the respective slide 128, 129 is derived from a stepper motor 181. A gear pinion 182 mounted on the output shaft of the motor 181 meshes with a respective gear-toothed rack 132, 133 secured to the measuring head carriage 111. The motor 181 is secured to a pivotable mounting 183 supported on a pivot pin 184 fixed to a lower bearing housing 185. A spring assembly 186 acts on the mounting 183 so as to urge the pinion 182 into meshing engagement with the associated toothed rack 132, 133. The bearing housing 185 straddles the horizontal portion of the slides 128, 129 and supports four bearing assemblies 145 and two roller assemblies 146 at each side thereof. Each of the eight bearing assemblies 145 includes a roller 147 arranged to run along either an upper or lower surface of the horizontal portion of the slide 128, 129.

Each of the two roller assemblies 146 on both sides of the housing 185 includes a roller 148 arranged to run along opposite vertical surfaces of the slide. A reader head 187 is provided for reading a scale provided adjacent the toothed rack 132, 133 to indicate the distance travelled by the camera 180 along the slide. Electrical signals corresponding to the distance travelled are transmitted to the remote control system.

Welded to the lower bearing housing 185 is an upper bearing housing 188 which supports a movable guide bar 189 of square cross-section. Four bearing assemblies 190 are provided in an upper plate 191 of the upper bearing housing 188, two of these bearing assemblies having rollers 192 in contact with one vertical side of the guide bar 189 and the other two of the bearing assemblies having rollers 192 in contact with the other vertical side of the guide bar 189. Four further bearing assemblies 190 are provided in a side plate of the upper bearing housing 188, two of these bearing assemblies 190 having rollers 192 in contact with the upper horizontal surface of the guide bar 189 and the other two bearing assemblies having rollers 192 in contact with the lower horizontal surface of the guide bar. Secured to a vertical surface of the guide bar 189 by means of a fixture 193 is a gear toothed rack 194. A stepper motor 195 is mounted on the upper bearing housing 188 and drives a pinion 196 which meshes with the rack 194. Supported at the forward end of the guide bar 189 is a carrier 197 in which a camera 153 is mounted. Thus, operation of the motor 195 transmits a drive through the pinion 196 and the rack 194 to the guide bar 189 and the camera 153. Linear movement of the camera 153 is measured by a reader head 199 which scans a scale arranged to move with the guide bar 189. Electrical signals corresponding to the distance travelled by the camera are transmitted to the remote control system.

Each of the four cameras 153 is thus movable along a respective slide 127, 128, 129, 130 and also in a direction perpendicular to the slides. The cameras 153 are operable in two modes: as measuring instruments to check the dimensions of the fuel assembly, or as means to carry out a visual inspection of the fuel rod surfaces. When used as measuring instruments, the cameras 153 operate as optical probes to obtain the focal length of surfaces viewed by the camera and corresponding information is transmitted to the remote control system. This information together with the signals transmitted by the reader head relating to the position of the camera is processed by a computer at the remote control position to determine the dimensions required. When operating as a surface inspection system, the cameras emit video signals to a video scanning system which combines the signals from all the cameras onto a single video recorder. The pictures obtained from each camera may be viewed on a monitor which may be divided into quadrants, each quadrant representing the picture from one of the cameras, thereby allowing all four sides of the fuel assembly to be viewed simultaneously.

If desired, touch probes may be incorporated in the camera assemblies 180, whereby measurements of the fuel assembly are checked by probes which are moved into contact with the fuel assembly. The signals emitted by the touch probes when they contact the fuel assembly surfaces and the signals from the reader heads are processed by the computer to determine the required dimensions.

The chain drive and tensioner unit 113 for raising and lowering the measuring head assembly 110 by means of the triplex chain 112 is illustrated in FIGS. 16, 17 and 18. Secured to the baseplate 12 is a drive unit support frame 210 to which a stepper motor 211 is attached by means of a mounting plate 212. An output shaft from the motor 211 is connected to a gearbox 213 by a coupling 214. The coupling 214 is mounted on a worm shaft 215 which drives a gear wheel mounted on a gearbox output shaft 216. A chain drive sprocket 217 is keyed to the output shaft 216 which is supported in a pedestal bearing 218 mounted on the support frame 210. Engaging the drive sprocket 217 is the triplex chain 112 which is connected to the measuring head carriage 111 and to counterweight 114. Tension is maintained in the chain 112 by a tensioner unit 219 arranged on the column 15. The tensioner unit 219 comprises a bracket 220 which encompasses and is frictionally clamped to the column 15. The bracket 220 has two side plates 221, 222 interconnected by two removable tie plates 223, 224 which are attached to the side plates by dome-head nut and screw assemblies 225. Each of the side plates 221, 222 and the tie plates 223, 224 extend substantially parallel to an adjacent side of the column 15. Extending through openings provided in the two side plates 223, 224 is an idler shaft 226 which is rotatably supported in bushes 227. Each of the bushes 227 is stationarily located in a bearing housing 228 secured to a respective side plate 221, 222. A chain tension sprocket 229 is mounted on the idler shaft 226 at an end thereof extending through the side plate 222. The tension sprocket 229 engages with the run of the triplex chain 112 at a position between the drive sprocket 217 and the counterweight 114. Connected to the end of the idler shaft 226 and extending through the side plate 221 is a universal coupling 230 which forms part of a manually-operated drive mechanism (not shown). This drive mechanism enables idler shaft 226 to be rotated manually so as to raise or lower the measuring head assembly 110 along the column 14.

The bracket 220 frictionally engages the column 15 by means of upper and lower friction pads 231. As seen in FIG. 18, the pads 231 extend through apertures 232 formed in the side plate 222 to contact a surface 233 of a guide rail 234 secured to and extending along the column 15. Each of the pads 231 is resiliently urged into contact with the guide rail surface 233 by four springs 235. Each spring 235 acts on a set of nuts 236 screwed on a pin 237 which is secured to the side plate 222. Lateral location of the bracket 220 is provided by several slide plates 238, a pair of which is associated with each of the upper and lower friction pads 231. The slide plates 238 are located against side surfaces 239 of the guide rail 234. Each plate 238 can be adjusted by loosening two nuts to allow axial movement of two screws 240. In a similar manner, upper and lower friction pads 241 extend through apertures formed in the side plate 221. The friction pads 241 are rigidly secured to the side plate 221 and are drawn against a further guide rail 242, secured to and extending along the column 15, by the action of the springs 235. Associated with each of the friction pads 241 is a pair of lateral slide plates 243 which are adjustable in a manner similar to that shown in FIG. 18.

Figure 20:
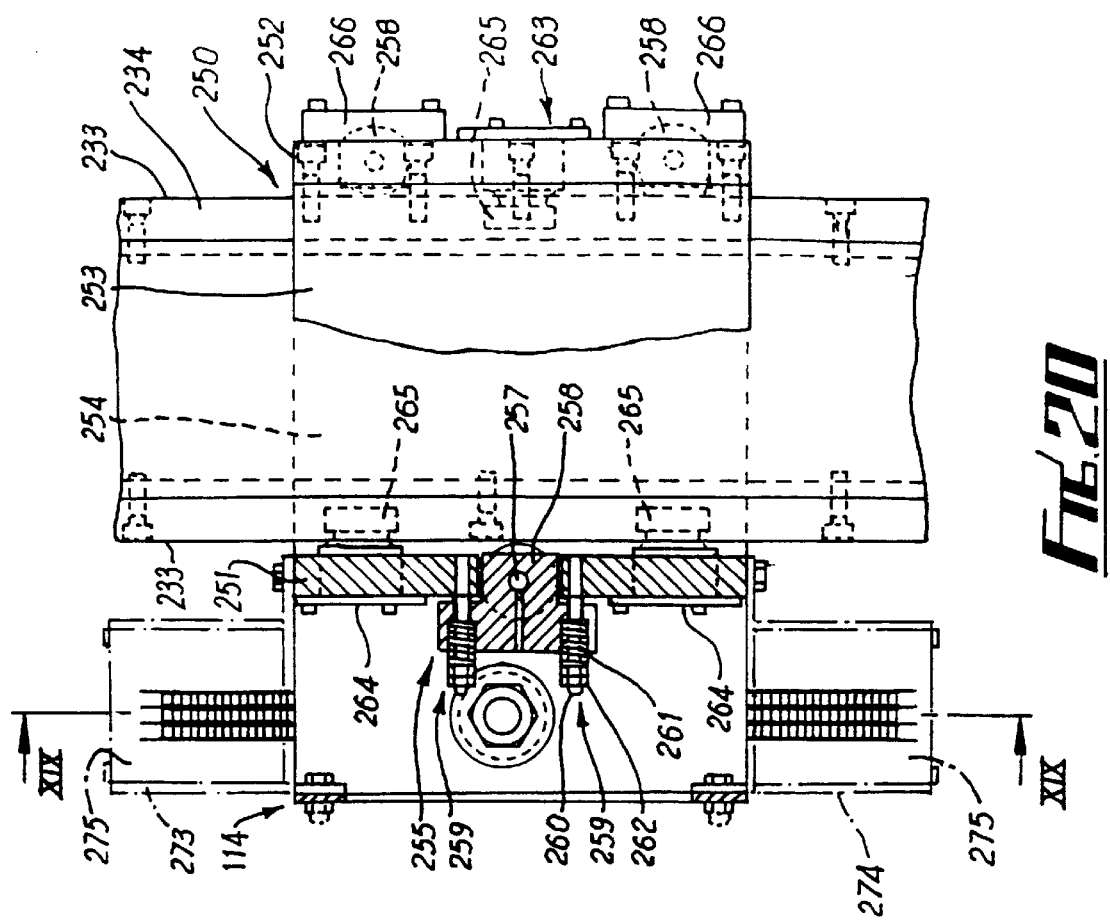
FIG. 20 is a part sectional end elevation taken on the line XX—XX in FIG. 19.
Figure 19:
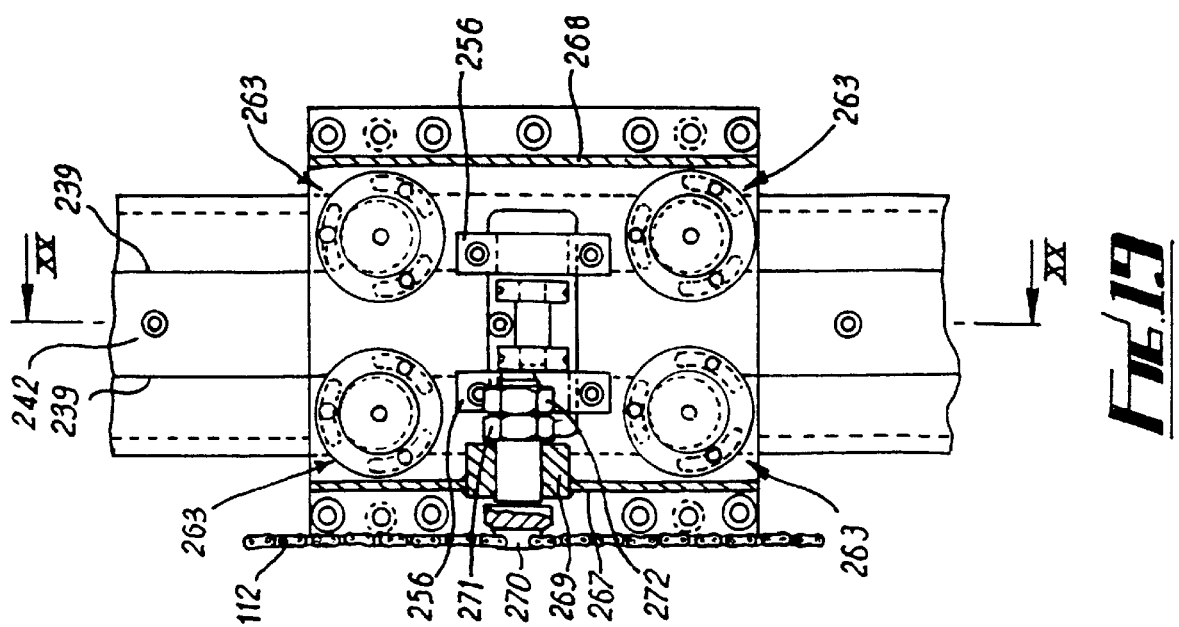
FIG. 19 is a sectional front elevation taken on the line XIX—XIX in FIG. 20 of a counterbalance device for the inspection station shown in FIG. 2.

To facilitate precise movement of the measuring head carriage 111 along the column 14 the weight of the measuring head assembly 110 is balanced by the counterweight 114. As seen in FIGS. 19 and 20, the counterweight 114 takes the form of a bracket 250 which encompasses the column 15. The bracket 250 has two bearing support plates 251, 252, interconnected by two removable tie plates 253, 254. The two support plates 251, 252 and the two tie plates 253, 254 define a rectangular opening through which the column 15 extends. A spring-loaded bearing assembly 255 is provided in the bearing support plate 251 and comprises two bearing housings 256 each of which supports a respective end of a stationary axle 257.

Rotatably supported on the axle 257 are two laterally spaced rollers 258 which run along the surface 233 of the guide rail 242. The rollers 258 are urged against the surface 233 by four spring assemblies 259, two of which are associated with each of the housings 256. Each of the spring assemblies 259 comprises a stud 260 secured to the support plate 251 and extending through the housing 256. Coil springs 261 surrounding the studs 260 are pre-loaded by means of nuts 262 so as to act on the bearing housings 256 and urge the rollers 258 against the guide rail surface 233. Four further bearing assemblies 263 are mounted in the side plate 251, two at the upper end and two at the lower end thereof. Each of the bearing assemblies 263 comprises a support 264, which is rotatable within the side plate 251, and a roller 265. The bearing assemblies 263 are so disposed that the rollers 265 run along a respective side surface 239 of the guide rail 233. Since the axes of the rollers 265 are offset with respect to the rotational axis of the support 264, rotation of the support enables the rollers 265 to be brought into contact with the guide rail side surfaces 239. Upper and lower bearing assemblies 266 are mounted in the bearing support plate 252. Each of the bearing assemblies 266 is similar to the bearing assembly 255, except that the former are not resiliently mounted. Thus, each of the bearing assemblies 266 includes a pair of rollers 258 arranged to run along the outer surface 233 of the guide rail 234. Contact of the rollers 258 with the surface 233 is maintained by the reaction produced by the springs 261 associated with the bearing assembly 255 in the bearing support plate 251. Intermediate the upper and lower bearing assemblies 266 are a further pair of bearing assemblies 263, each including a roller 265 arranged to run along a side surface 239 of the guide rail 234. These bearing assemblies 263 are of a similar construction to the bearing assemblies 263 in the bearing support plate 251 and therefore the eccentrically mounted rollers 265 can be adjusted in a similar manner to bring them into contact with the guide rail side surfaces.

Two extension plates 267, 268 are attached to the bearing support plate 251. An annular boss 269 is provided in the extension plate 267 for supporting a chain connector 270 which is secured in the boss 269 by a nut 271 and a locknut 272. Attached to the connector 270 are two end links of the drive chain 112. Casings 273, 274 formed on the top and bottom, respectively, of the extension plates 267, 268 each accommodates a lead weight 275. The weights of the two lead weights are selected so that the total weight of the counterbalance 114 matches precisely the weight of the measuring head assembly 110.

As seen in FIG. 2, the run of the chain 112 attached to the measuring head assembly 110 extends from the drive sprocket 217 to a sprocket 280 mounted on the baseplate 12. From the sprocket 280 the chain 112 is attached to the carriage 111 (see FIG. 11) and is then trained around two further sprockets 281, 282 supported from the top plate 13. After passing around the sprocket 282 the chain 112 is connected to the counterbalance 114 (see FIGS. 19 and 20) and then extends to the driven sprocket 229 of the chain tensioner unit 219 which maintains the desired tension in the chain.

Referring again to FIG. 2, the fuel assembly 1 is initially held in place by a pneumatic clamping assembly 300 arranged for movement along the column 16. The clamping assembly 300 comprises a carrier 301 which incorporates a plurality of bearing assemblies 302. Each bearing assembly 302 includes a roller (not shown) arranged to run along the side surfaces of guide rails 303 attached to the column 16. This arrangement is similar to that employed on the measuring head carriage 111, as previously described with reference to FIGS. 10 and 11. A clamping head 304 attached to the carrier 301 has four sides 305 which define a rectangular aperture through which the fuel assembly 1 extends. Secured to each of the four sides 305 is a pneumatic cylinder 306, the operation of which moves a clamping plate (not shown) towards and away from the sides of the fuel assembly 1.

The driving arrangement and the counterbalance system for the clamping assembly 300 are similar to those employed for the measuring head carriage 111. Movement of the carrier 301 is effected by a triplex drive chain 307 which is driven by a drive sprocket 308. Rotation of the drive sprocket 308 is derived from a stepper motor and gearbox assembly 309. From the drive sprocket 308 the chain 307 extends upwardly around a tension sprocket 310 and then connects to a counterbalance 311 which is arranged to move along the column 17 (see FIG. 4). The counterbalance 311 is of a similar design to the counterbalance 114 (see FIGS. 19 and 20) employed for the measuring head assembly 110 and serves to counteract the weight of the clamping assembly 300. After connection to the counterbalance the chain 307 extends upwardly and is trained successively around two further sprockets 312, 313 supported by the top plate 13. The chain 307 then extends downwardly for connection to the carrier 301 and then finally around a sprocket 314 supported on the baseplate 12.

Before the inspection station 11 can be used to carry out the inspection procedures on a fuel assembly it must be calibrated accurately in each of its moving axes for straightness, linear measurement and squareness between each of the axes. Calibration in the Z axis of each column, corresponding to the longitudinal direction of a fuel assembly, may be carried out using a laser interferometry technique so as to check straightness in two planes and linearity in the third plane. Calibration in the two Y axes, corresponding to the directions along two opposite sides of the fuel assembly, and the two X axes, corresponding in directions to the other two opposite sides of the fuel assembly, may be carried out with the aid of an accurately constructed granite artefact to check for squareness of each axis to the other.

Before receipt of a fuel assembly 1 the various components of the inspection station 11 are positioned at their required initial locations.

In particular, the measuring head carriage 111 is lowered down the column 14 by means of the chain 112, moved by the chain drive and tensioner unit 113, so that the camera and probe assemblies 140 are below the top of the base assembly 18. Each of the four cameras 153 and the two channel spacing probes 157 are in their fully retracted positions. With the clamping plates associated with the pneumatic cylinders 306 in the retracted positions, the carrier 301 of the clamping assembly 300 is lowered down the column 16 by the chain 307 which is driven by the stepper motor and gearbox assembly 309.

The carrier 301 is located so that the clamping head 304 is positioned above the camera and probe assemblies 140 but below the top of the base assembly 18. The two top nozzle locating pins 30 in the top nozzle support 19 are fully retracted into the guide passages 27, as shown in FIG. 5. In the base assembly 18, see FIG. 6, the two locating pins 55 are extended above their respective guide housings 54 by operation of the pneumatic actuators 58. The gimbal 94 is elevated to its raised position by actuation of the hydraulic/pneumatic intensifier 79. The intensifier 79 acts on the plate 86 and the connecting member 85 to move the sleeve 81 through the post 35. This causes elevation of the gimbal mount 88, which, in turn, raised the gimbal 94.

A fuel assembly handling system (not shown) brings a fuel assembly 1 from a fuel assembly construction apparatus and places the fuel assembly so that the bottom nozzle 2 rests on the raised gimbal 94. The gimbal 94 is raised sufficiently so that lower surfaces 4 of two diagonally opposite feet 3 of the bottom nozzle 2 are above the upper surfaces 108 of the two radial protrusions 48, 50 and the lower surfaces 4 of the other two diagonally opposite feet 3 are above the upper surfaces 109 of the two guide housings 54. Each of the locating pins 55 extends into a respective locating hole 5 provided in the feet 3.

By operation of the stepper motor and gearbox assembly 309 the carrier 301 is then moved up the column 16 to a position substantially as shown in FIG. 2. Activation or the pneumatic cylinders 306 extends the associated clamping plates so as to engage and securely hold the fuel assembly 1. Sensors incorporated in the clamping assembly 300 confirm that the fuel assembly 1 has been secured, enabling the fuel assembly handling system to be withdrawn. By actuation of the pneumatic cylinders 28 the locating pins 30 are partially extended so that the reduced diameter portions 32 are located within the locating holes 7 provided in the top nozzle 6. The pneumatic cylinders 306 are then actuated to release the clamping plates from the fuel assembly 1. The weight of the fuel assembly 1 is transmitted to the load cell 80 through the gimbal mounting arrangement 78. Signals corresponding to the weight of the fuel assembly are transmitted by the load cell 80 to a computer system which records and stores the transmitted data.

After recording and storing the fuel assembly weight data, the intensifier 79 is activated to lower the gimbal 94 thereby allowing the feet 3 to rest on the base assembly 18. Actuation of the pneumatic cylinders 28 is then effected so as to fully extend the locating pins 30 and to insert the maximum diameter of the pins into the top nozzle locating holes 7. The stepper motor and gearbox assembly 309 is operated so that the chain 307 moves the carrier 301 up the column 16 to a park position at which the sides 305 are located above the upper end of the fuel assembly 1. Operation of the chain drive and tensioner unit 113 is then initiated to lower the measuring head carriage 111 so that it is returned to its initial position.

The inspection station 11 is now in a condition to carry out an envelope check on the fuel assembly 1 which involves obtaining external measurements of the assembly. To facilitate this procedure, datum points on the fuel assembly are designated. Thus, for measurements in the Z (vertical direction) of the fuel assembly the lower surfaces 4 of the bottom nozzle 2 serve as the Z datum points. For horizontal measurements, a corner of the bottom nozzle defines the XY datum point. Thus, measurements along the X axis represent horizontal measurements along two opposite faces of the assembly, and measurements along the Y axis represent measurements along the other two faces at right angles to the measurements along the X axis.

To effect the envelope measurement check, the carriage 111 is raised so that the optical probe cameras 153 of the two camera and probe assemblies 140 (FIGS. 12, 13) and the two camera assemblies 180 (FIGS. 14, 15) are positioned so as to view the surfaces of the bottom nozzle 2. By operation of the stepper motors 141, the gear pinions 142 rotate and, by virtue of their meshing engagement with the respective toothed racks 131, 134, the camera and probe assemblies 140 are moved along their respective slides 131, 134. At specified measuring points, each of the motors 141 is stopped and the stepper motors 150 are operated so that rotation of the leadscrews 151 causes forward movement of the operating bars 152. Thus, cameras 153 are moved towards the bottom nozzle 2 until the bottom nozzle surface is in focus. The positions of the cameras 153 are known from signals emitted by a reader head (not shown) scanning a scale adjacent the toothed racks 131, 134 and by the reader heads 156 which scan the scales fixed to the operating bars 152. The signals from the reader heads are transmitted for storage at the remote control system where they are processed according to a dimensional check routine.

Similarly, by operation of the stepper motors 181 the rotating gear pinions 182 move along the respective toothed racks 132, 133 so that the camera assemblies 180 are moved along their respective slides 128, 129. Each of the motors 181 is stopped at the required measuring point and then the stepper motors 195 are operated to move the guide bars 189 in a forward direction. This causes the cameras 153 to move towards the bottom nozzle 2 until the surface thereof is in focus. The positions of the cameras are known from signals emitted by the reader heads 187 which scan the scales adjacent to the toothed racks 132, 133 and by the reader heads 199 which scan the scales associated with the guide bars 189. The signals from the reader heads are transmitted for storage at the remote control system where they are processed according to a dimensional check routine. Each of the four cameras 153 can be operated to carry out a dimensional check at several spaced positions, typically at three positions, along the bottom nozzle surface.

The chain drive and tensioner unit 113 is then operated so that the chain 112 raises the measuring head carriage 111 up the column 14. The carriage 111 is positioned so that the cameras 153 are able to view the surfaces of the fuel assembly top nozzle 1. A check on the dimensions of the top nozzle is then carried out in accordance with the procedure described above for the bottom nozzle. Dimensional checks for each of the spacer grids 9 are then carried out as described above for the top and bottom nozzles.

After checking the XY (horizontal) dimensions of the fuel assembly 1, the measuring head carriage 111 is lowered to a position below the fuel assembly. The four cameras 153 are each moved to a position at one end of their respective slides 127, 128, 129, 130 and retracted away from the fuel assembly. Various measurements of the fuel assembly 1 in the Z (vertical) direction are then checked. This is effected by moving the carriage 111 along the column 14 to the desired position and then moving the cameras 153 horizontally along their respective slides 127, 128, 129, 130 to the required measurement positions. Movement of the carriage 111 along the column 14 is then carried out while using the cameras 153 to detect the upper and lower limits of the component surfaces. The reader head provided on the carriage 111 scans the scale fixed to a guide rail 122 on the column 14 to enable the vertical position of the carriage above the Z datum to be established. This information, in conjunction with the detection signals provided by the cameras 153, is processed by the remote control system to check the required Z-heights. The Z-heights obtained by the foregoing procedure can include the height of the upper surface of the bottom nozzle and the lower end of the fuel rods 10, the heights of the top edges of the spacer grids 9 above the Z-datum, the distance between the upper ends of the fuel rods 10 and the lower surface of the top nozzle 7, and the height of the upper surface of the top nozzle above the Z-datum. The data resulting from the above-mentioned dimensional checks are stored at the remote control system and compared with the data representing the desired measurements for the fuel assembly. After completion of the Z-height dimensional checks, the cameras are retracted to the initial position below the fuel assembly.

The four cameras 153 can also be used to provide a visual check of the fuel rod surfaces, enabling surface defects, such as scratches or other marks, to be detected. This involves traversing the measuring head carriage 111 along the column 14 while focusing the cameras 153 on a pair of fuel rods 10.

The carriage 111 is moved along the fuel assembly several times, the cameras being moved laterally each time so as to view a different pair of fuel rods. An output signal is taken from all of the cameras and combined onto a single video recorder for display on a colour monitor screen. The screen may be divided into quadrants, each quadrant representing the image viewed by one camera. From the screened image, the operator is able to detect surface imperfections on the fuel rods. Following the surface examination procedure the cameras 153 are retracted and the measuring head carriage 111 is returned to below the fuel assembly 1.

The channel spacings between adjacent fuel rods 10 can be checked using the two probes 157 associated with the camera and probes assemblies 140, see FIGS. 12 and 13. This procedure entails moving the measuring head carriage 111 along the column 14 to the required vertical position and then operating the stepper motor 141 to move the camera and probe assemblies 140 along the slides 127, 130 to the first channel spacing to be checked. The stepper motors 158 are operated so as to advance the probes 157 through a respective calibration device 170. The probes 157 are then advanced through the fuel rod spacings to a selected depth into the fuel assembly. Electrical signals corresponding to the mechanical deflections of the probes 157 are transmitted to the remote control system where they are processed to enable the gap between adjacent fuel rods to be determined. This procedure is then repeated at all of the selected measuring positions until all of the required channel spacing measurements have been obtained.

After all of the channel spacing checks have been completed, the cameras 153 and the channel spacing probes 157 are retracted and the measuring head carriage 111 is moved to below the bottom of the fuel assembly.

To correct the tendency of a fuel assembly 1 to incline from the perpendicular, the following procedure is carried out. The two lower locating pins 55 are inserted into the bottom nozzle locating holes 5 and the two upper locating pins 30 are extended so that the larger diameter portion of each pin extends into the top nozzle locating holes 8. The fuel assembly 1 is now supported in a true vertical position.

If the data obtained from the foregoing dimensional checks indicates that the fuel assembly tilts, ie that it is inclined to the perpendicular this requires rectification by removing the required amount of material from the lower surfaces 4 of the bottom nozzle. The tilt rectification procedure is initiated by the operator selecting a 'grinding' option at a control computer. This procedure entails switching on two viewing cameras (not shown) arranged on either side of the base assembly 18. With the four cameras 153 and the two probes 157 in their retracted positions, the measuring head carriage 111 is raised to a position substantially mid-way along the fuel assembly 1. Operation of the stepper motor and gearbox assembly 309 lowers the clamping assembly 300 to a position substantially as shown in FIG. 2.

Suction means (not shown) are then switched on to create a vacuum within the shroud 70 (see FIG. 7). Both of the two locating pins 55 are then retracted from the bottom nozzle locating holes 5 so as to be withdrawn into the guide housings 54. The gimbal 94 is then moved to a raised position by actuation of the hydraulic/pneumatic intensifier 79. As the gimbal 94 moves to the raised position it engages a recessed surface 4a of the lower support member 3. The fuel assembly 1 is therefore raised so that the lower surfaces 4 are elevated above the upper support surfaces 108, 109 of the rotor 43. Since the gimbal 94 is supported on the gimbal mount 88 by a spherical bearing, formed by the spherical female bearing cup 95 and the spherical male portion 91, compensation is made for any possible inclination of the recessed surface 4a. As movement of the gimbal 94 occurs along the longitudinal central axis A of the fuel assembly 1 and the top nozzle 7 is restrained by the locating pins 30, the fuel assembly 1 is retained truly vertical when in the raised position.

Pressurised air is supplied through the supply pipe 64 to the pneumatic motor 63 to cause rotation of the grinding wheel 66. Referring to FIG. 9, the actuator 105 is operated so as to withdraw the shotbolt 102 from the aperture 103 in the rotor 43. The stepper motor 41 is then operated to rotate the output shaft 40 and the gear teeth 39 formed thereon which is in meshing engagement with the gear wheel 37. Since the gear wheel 37 is connected to the fixed mounting member 33, the gear teeth 39 move around the periphery of the gear wheel 37. The bracket 42 on which the stepper motor 41 is mounted is secured to the rotor 43 so that the latter rotates around the post 35 forming part of the mounting member 33. As a result, the grinding assembly 62 rotates about the central axis of the base assembly 18. The rotating grinding wheel 66 is raised in incremental steps by operation of the stepper motor 77 until contact is made with a lower surface 4 of a bottom nozzle foot 3. Such contact can be determined audibly or visually by viewing a monitor screen displaying images transmitted by the two viewing cameras. If the first pass does not achieve the removal of material from each of the lower surfaces 4, the grinding wheel 66 is raised by a further increment. This is achieved by rotating the output shaft 75 of the stepper motor 77 to cause an upward axial movement of the extension piece 74 and the sleeve 72 and, in consequence thereof, the motor 63 and the grinding wheel 66. Incremental movement of the grinding wheel 66 is continued until material is being removed by the grinding wheel 66 from the lower surfaces 4 of each of the bottom nozzle feet 3. This can be observed by the operator viewing a monitor screen which displays images transmitted by the two viewing cameras. Each incremental movement of the grinding wheel 66 may be by an amount set between 5–20 micron. Waste material removed from the bottom nozzle is removed from within the shroud 70 by the suction means. As a result of the grinding operation, the lower surfaces 4 of the bottom nozzle 2 will lie in a horizontal plane which is parallel to a horizontal plane containing the support surfaces 108 and 109. Thus, when the fuel assembly 1 stands on the bottom nozzle feet 3, the assembly should be truly perpendicular.

The grinding operation is terminated by turning off the motor 63 and then retracting the grinding wheel 66. After stopping the stepper motor 41, the rotor 43 is secured by engaging the shotbolt 102 therewith and then the suction source is turned off. The locating pins 55 are raised so as to be inserted in the bottom nozzle locating holes 5. Lowering of the gimbal 94 allows the bottom nozzle lower surfaces 4 to rest on the support surfaces 108 and 109. With the four cameras 153 in their retracted positions, the measuring head carriage 111 is lowered to a position below the fuel assembly 1. After releasing the clamping plates on the clamping assembly 300, the latter is moved to a position above the fuel assembly 1. The two viewing cameras can now be turned off.

If required, the procedure described above for checking whether the fuel assembly is inclined with respect to the perpendicular can be repeated and, if necessary, rectification can be carried out by removing additional material from the bottom nozzle 2.

After completion of the inspection procedures, the fuel assembly 1 is held by the clamping assembly 300, and the bottom and top nozzle locating pins 55, 30, respectively are retracted. With the measuring head carriage 111 positioned below the fuel assembly, the fuel assembly handling system is operated to engage the assembly. The clamping assembly 300 is then de-activated and moved to a position below the fuel assembly 1 which can now be removed by the handling system.

We claim:

1. Apparatus for rectifying the tendency of a nuclear fuel assembly (1) to incline from the perpendicular, the fuel assembly having interconnected upper and lower support members (7,2), the apparatus comprising an upper locating means (19) for locating said upper support member (7), a base assembly (18), and material removal means (66) for removing material from a lower surface (4) of the lower support member (2), characterised in that the base assembly (18) includes a support surface (108,109) lying in a horizontal plane for supporting the lower surface (4) of the lower support member (2) whereby the fuel assembly (1) extends perpendicularly between the upper locating means (19) and said base assembly (18), elevating means (78,79) incorporated in said base assembly (18), the elevating means being operable to engage the lower support member (2) and raise the fuel assembly, the material removal means (66) being operable to remove material from the lower surface (4) of the lower support member 12) when raised by the elevating means (78,79) whereby said lower surface (4) is made to lie in a horizontal plane.

2. Apparatus according to claim 1, wherein the elevating means (78,79) are operable to raise the lower surface (4) above the support surface (108,109).

3. Apparatus according to claim 1, wherein the elevating means (78,79) moves along an axis coaxial with a longitudinal central axis of the fuel assembly (1).

4. Apparatus according to claim 1, wherein the lower support surface comprises a plurality of lower surfaces (4), the material removal means (66) being operable to remove material from each of the lower surfaces, whereby each of the lower surfaces is made to lie in said horizontal plane.

5. Apparatus according to claim 1, wherein the elevating means comprises a gimbal mounting arrangement (78) which includes a gimbal member (94) movably supported on a gimbal mount (88) and arranged to engage the lower support member (2).

6. Apparatus according to claim 5, wherein the gimbal member (94) has a spherically-shaped female bearing portion (95) which receives a spherically-shaped male bearing portion (91) provided on the gimbal mount (88).

7. Apparatus according to claim 3, wherein the material removal means comprises a grinding wheel (66), the grinding wheel being mounted on a rotor member (43) arranged for rotation about the axis along which the elevating means moves.

8. Apparatus according to claim 7, wherein the grinding wheel (66) is radially spaced from the axis about which the rotor member (43) rotates, whereby the grinding wheel (66) is able to remove material from each of the lower surfaces (4) during one revolution of the rotor member (43).

9. Apparatus according to claim 8, wherein the base assembly (18) includes a vertical post (35), the rotor member (43) being arranged to rotate about the post, and wherein pressurised air bearings (46) are provided between the post (35) and the rotor member (43).

10. Apparatus according to claim 7, wherein the base assembly (18) includes a stationary gear wheel (37) arranged coaxially with respect to the axis along which the elevating means moves, the gear wheel having gear teeth provided around the periphery thereof, and a drive motor (41) mounted on said rotor member (43) the drive motor having an output gear wheel (39) arranged to mesh with the stationary gear wheel (37).

11. Apparatus according to claim 7, wherein drive means (77) are provided for moving the grinding wheel (66) along its axis of rotation.

12. Apparatus according to claim 11, wherein the drive means for moving the grinding wheel (66) along its axis of rotation comprises a stepper motor (77) which moves the grinding wheel (66) along said axis of rotation in incremental steps.

13. Apparatus according to claim 1, wherein the base assembly (18) includes at least one locating pin (55) and actuator means (58) for extending and retracting the locating pin (55) along a vertical axis, whereby the locating pin can be inserted into or retracted from a locating hole (5) provided in said lower support member (2).

14. Apparatus according to claim 1, wherein the upper locating means (19) includes at least one upper locating pin (30) and further actuating means (28) for extending and retracting said upper locating pin (30) along a vertical axis, whereby the upper locating pin (30) can be inserted into or retracted from an upper locating hole (8) provided in the upper support member (7).

15. Apparatus according to claim 14, wherein the upper locating pin (30) comprises a larger diameter portion of substantially the same diameter as that of the upper locating hole (18) and a reduced diameter end portion (32), the further actuator means (28) being operable to insert the larger diameter portion or the reduced diameter end portion (32) into the upper locating hole (8).

16. Apparatus according to claim 1, wherein the base assembly (18) includes measuring means (80) for determining the weight of the fuel assembly (1).

17. Apparatus according to claim 16, wherein the measuring means comprises a load cell (80) located beneath the elevating means (78,79).

\* \* \* \* \*